(12) United States Patent
Ho

(10) Patent No.: US 12,056,306 B2
(45) Date of Patent: Aug. 6, 2024

(54) ELECTRONIC SYSTEM AND INTEGRATED APPARATUS FOR SETUP TOUCH SENSITIVE AREA OF ELECTRONIC PAPER TOUCH PANEL AND METHOD THEREOF

(71) Applicant: EGALAX_EMPIA TECHNOLOGY INC., Taipei (TW)

(72) Inventor: Shun-Lung Ho, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 17/559,120

(22) Filed: Dec. 22, 2021

(65) Prior Publication Data

US 2022/0197429 A1 Jun. 23, 2022

Related U.S. Application Data

(60) Provisional application No. 63/128,911, filed on Dec. 22, 2020.

(51) Int. Cl.
| | | |
|---|---|---|
| G06F 3/041 | (2006.01) | |
| G06F 3/042 | (2006.01) | |
| G06F 3/044 | (2006.01) | |
| G06F 3/04812 | (2022.01) | |
| G06F 3/14 | (2006.01) | |

(52) U.S. Cl.
CPC .......... *G06F 3/0416* (2013.01); *G06F 3/0412* (2013.01); *G06F 3/04186* (2019.05); *G06F 3/0428* (2013.01); *G06F 3/0446* (2019.05); *G06F 3/04812* (2013.01); *G06F 3/14* (2013.01)

(58) Field of Classification Search
CPC ....... G06F 3/014; G06F 3/0412; G06F 3/0446
USPC .......................................................... 345/174
See application file for complete search history.

(56) References Cited

U.S. PATENT DOCUMENTS

| | | | | |
|---|---|---|---|---|
| 2010/0201657 A1* | 8/2010 | Miyazaki | ................ | G02F 1/167 345/205 |
| 2011/0092222 A1* | 4/2011 | Kuo | ...................... | H04W 4/029 455/456.1 |
| 2012/0154301 A1* | 6/2012 | Kang | .................. | G06F 3/04817 345/173 |
| 2014/0173482 A1* | 6/2014 | Hicks | .................. | G06F 3/04883 715/769 |
| 2014/0184471 A1* | 7/2014 | Martynov | ........... | H04M 1/0266 345/1.2 |
| 2017/0344254 A1* | 11/2017 | Zhang | ..................... | G06F 1/165 |

* cited by examiner

*Primary Examiner* — Calvin C Ma
(74) *Attorney, Agent, or Firm* — WPAT, PC

(57) ABSTRACT

A method for setup a touch sensitive area of an electronic paper touch panel is provided. The method comprising: having an electronic paper display of the electronic paper touch panel marking an existing first touch sensitive area in a first display format; detecting an event via touch electrodes of the electronic paper touch panel; setting up a second touch sensitive area according to the detected event; and having the electronic paper display marking the second touch sensitive area in a second display format.

22 Claims, 12 Drawing Sheets

1100

1105
notifying a host into a setup mode

1110
having an electronic paper display to mark an initial touch sensitive area in a first display format

1120
detecting an event via touch electrodes

1130
detected ?  
No / Yes

1140
setting up a temporary touch sensitive area according to the detected event(s)

1150
having the electronic paper display marking the temporary touch sensitive area in the first display format

1160
exit setup mode ?  
No / Yes

1170
setting the temporary touch sensitive area as a new touch sensitive area

1180
reporting the new touch sensitive area to the host and exiting the setup mode

FIG. 11

ELECTRONIC SYSTEM AND INTEGRATED APPARATUS FOR SETUP TOUCH SENSITIVE AREA OF ELECTRONIC PAPER TOUCH PANEL AND METHOD THEREOF

CROSS REFERENCE TO RELATED PATENT APPLICATION

This patent application claims benefits of a U.S. provisional patent application No. 63/128,911 filed on Dec. 22, 2020.

FIELD OF THE INVENTION

The present invention relates to touch panel, and more particularly, to electronic paper touch panel.

BACKGROUND OF THE INVENTION

Existing laptop computers usually feature a clamshell design with an upper plate and a lower plate. The upper plate contains a display and the lower plate comprises a keyboard and a touch panel. For example, a surface of the lower plate 100 as shown in FIG. 1, an upper part of the surface comprises a keyboard area 110 having multiple keys. A touch panel 120 is arranged at the center of a lower part of the surface. When a user types the keyboard area 110, hands rest at areas besides the touch panel 120.

In the design as shown in FIG. 1, the user cannot adjust position and size of the touch panel 120. Hence, when typing in the keyboard area 110, the touch panel 120 may be contacted accidentally. When utilizing the touch panel 120, the user may feel that area of the touch panel 120 is too small to use. Hence, it desires to have an apparatus and a system which have a touch panel with adjustable position and size so as the user can adjust the touch panel at his will and be aware of the position of the touch panel. Thus, user experience and input efficiency can be improved accordingly.

SUMMARY OF THE INVENTION

According to one embodiment of the present application, a control method for an electronic paper touch panel is provided. The control method comprising: having an electronic paper display of the electronic paper touch panel marking a touch sensitive area; detecting an event corresponding to an external object via multiple touch electrodes of the electronic paper touch panel; when the event is detected, determining whether a position of the event is inside the touch sensitive area; when it is determined that the position of the event is inside the touch sensitive area, reporting the event to a host; and when it is determined that the position of the event is outside the touch sensitive area, not reporting the event to the host.

According to an embodiment of the present application, an electronic system is provided. The electronic system comprising: an electronic paper touch panel, a touch sensitive processing apparatus, an electronic paper controller; and a host connected with the touch sensitive processing apparatus and the electronic paper controller. The electronic paper controller is configured for having an electronic paper display of the electronic paper touch panel marking a touch sensitive area. The touch sensitive processing apparatus further comprising: an interconnection network, for connecting with touch electrodes of the electronic paper touch panel, respectively; a driving circuit, for connecting with the interconnection network; a sensing circuit, for connecting with the interconnection network; an interface module for connecting with the host; and a processor, for executing instructions stored in a non-volatile memory for: having the driving circuit, the sensing circuit and the interconnection network for detecting an event corresponding to an external object via multiple touch electrodes of the electronic paper touch panel; when the event is detected, determining whether a position of the event is inside the touch sensitive area; when it is determined that the position of the event is inside the touch sensitive area, reporting the event to the host; and when it is determined that the position of the event is outside the touch sensitive area, not reporting the event to the host.

According to an embodiment of the present application, an integrated apparatus for controlling an electronic paper touch panel is provided. The integrated apparatus comprising: an interconnection network, for connecting with touch electrodes of the electronic paper touch panel, respectively; a driving circuit, for connecting with the interconnection network; a sensing circuit, for connecting with the interconnection network; an interface module for connecting with a host; a second interconnection network, for connecting with electrodes of an electronic paper display of the electronic paper touch panel, respectively; a control circuit, for connecting with the second interconnection network; a processor, for executing instructions stored in a non-volatile memory for: having the control circuit to make the electronic paper display marking a touch sensitive area via the second interconnection network; having the driving circuit, the sensing circuit and the interconnection network for detecting an event corresponding to an external object via the touch electrodes of the electronic paper touch panel; when the event is detected, determining whether a position of the event is inside the touch sensitive area; when it is determined that the position of the event is inside the touch sensitive area, reporting the event to the host; and when it is determined that the position of the event is outside the touch sensitive area, not reporting the event to the host.

According to an embodiment of the present invention, an electronic system is provided. The electronic system comprising the electronic paper touch panel, the integrated apparatus and the host.

According to an embodiment of the present application, a method for setup a touch sensitive area of an electronic paper touch panel is provided. The method comprising: having an electronic paper display of the electronic paper touch panel marking an existing first touch sensitive area in a first display format; detecting an event via touch electrodes of the electronic paper touch panel; setting up a second touch sensitive area according to the detected event; and having the electronic paper display marking the second touch sensitive area in a second display format.

According to an embodiment of the present application, an electronic system is provided. The electronic system comprising: an electronic paper touch panel; a touch sensitive processing apparatus; an electronic paper controller; and a host connected with the touch sensitive processing apparatus and the electronic paper controller. The host executes instructions stored in a non-volatile memory for: having the electronic paper controller to control an electronic paper display of the electronic paper touch panel marking an existing first touch sensitive area in a first display format; having the touch sensitive processing apparatus detecting an event via touch electrodes of the electronic paper touch panel; having the touch sensitive processing apparatus setting up a second touch sensitive area according to the detected event; and having the electronic paper controller to control the electronic paper display marking the second touch sensitive area in a second display format.

According to an embodiment of the present application, a electronic system is provided. The electronic system comprising the electronic paper touch panel, the integrated apparatus and the host.

The mechanism for setting up a touch sensitive area provided by the present application can let the user freely customize the position and the size of the touch sensitive area of the electronic paper touch panel. This can maximize user experience, accelerate input efficiency and prevent consequence and damages caused by mistaken touch to the touch panel.

The touch sensitive mechanism of an electronic paper touch panel provided by the present application can let the user freely use multi-finger inputs and can detect approaching, touching and pressing events. It can increase input options and user experiences.

BRIEF DESCRIPTION OF THE DRAWINGS

The advantages and spirit related to the present invention can be further understood via the following detailed description and drawings.

FIG. 11, which depicts a flowchart diagram of a method 1100 for setup a touch sensitive area in accordance with an embodiment of the present application.

DETAILED DESCRIPTION OF THE PREFERRED EMBODIMENT

Figure 1:
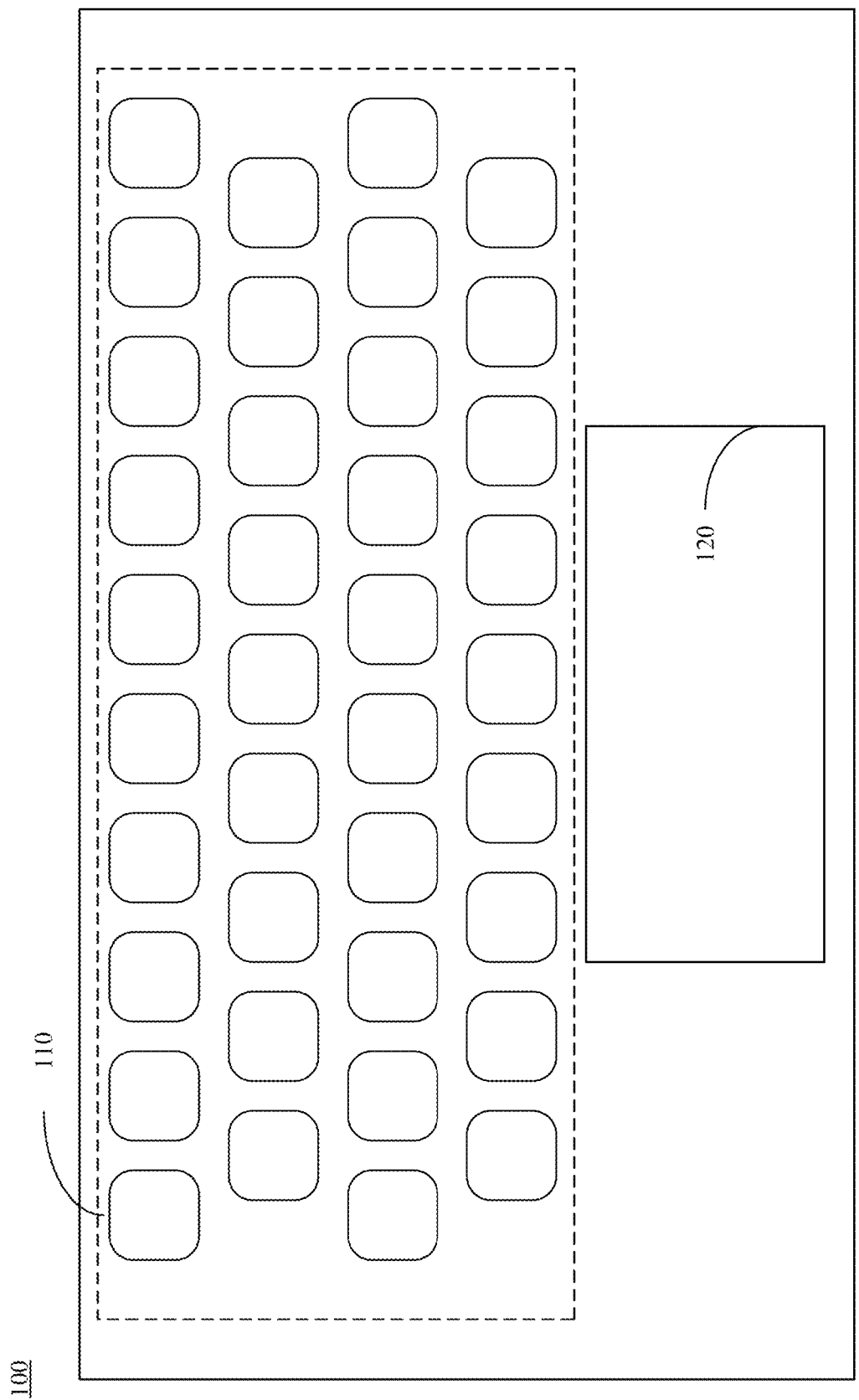
FIG. 1 depicts a surface of a lower plate of a notebook computer.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Figure 2A:
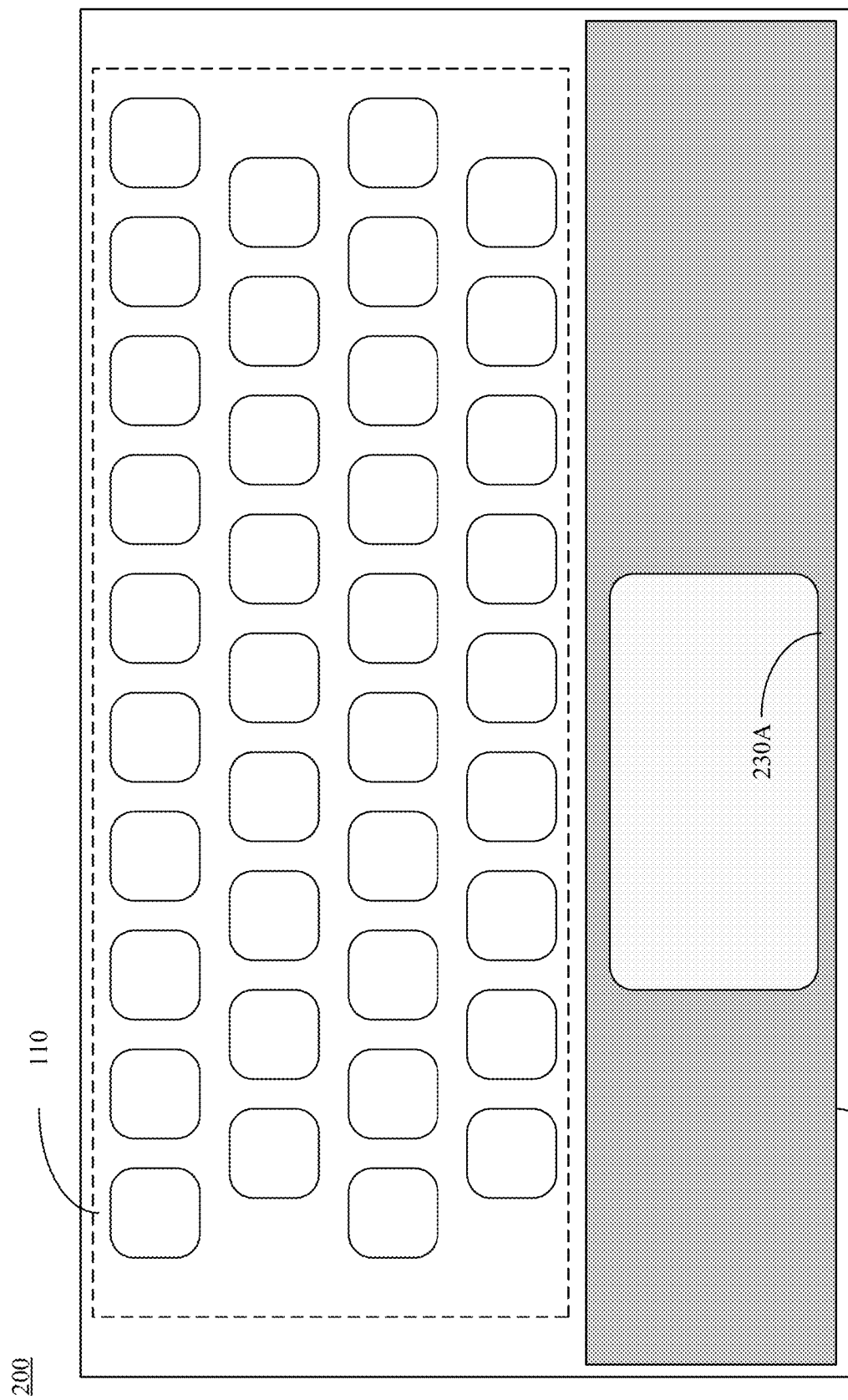
FIG. 2A illustrates a diagram of an input apparatus 200 according to an embodiment of the present application.

Please refer to FIG. 2A, which illustrates a diagram of an input apparatus 200 according to an embodiment of the present application. The input apparatus 200 may comprise a keyboard area 110 and an electronic paper touch panel 220. The electronic paper touch panel 220 is usually disposed a side near a user. The keyboard area 110 is away from the user. As shown in FIG. 2A, a surface of the input apparatus 200 is divided into two areas.

The electronic paper touch panel 220 comprises a two or more color electronic paper display. As shown in the electronic paper touch panel as shown in FIG. 2A, a rectangular area 230A presents a lighter color. The rest area shows a darker color. Under the electronic paper display of the electronic paper touch panel 220, there are multiple touch electrodes. It may use these touch electrodes to detect one or more touches of fingers and/or styli.

In the embodiment as shown in FIG. 2A, only an approaching/touching/pressing (ATP) event occurred in the rectangular area 230A would be inputted into a host coupled to the input apparatus 220. In the present application the ATP event comprises an approaching event, a touching event and/or a pressing event detected by a touch sensitive processing apparatus coupled to the touch electrodes caused by an external conductive object (e.g. a finger or a passive stylus) approaches, touches and/or presses the electronic paper touch panel 220.

The electronic paper display of the input apparatus 220 can show the rectangular area 230 in a different color. And the user can configure the size and the position of the rectangular area 230 in the electronic paper touch panel 220 by various input methods. In one embodiment, the host may show graphics representing the electronic paper touch panel 220 and the rectangular area 230 on a display. The user may use mouse and/or keyboard to adjust the graphics to configure the size and the position of the rectangular area 230. In an alternative embodiment, the host may show graphics representing the electronic paper touch panel 220 and the rectangular area 230 on a touch screen. The user may use his finger or a stylus to adjust the graphics on the touch screen to configure the size and the position of the rectangular area 230. In one embodiment, the host or an integrated device which controls the electronic paper touch panel 220 may allow the user to configure the size and the position of the rectangular area 230 directly on the electronic paper touch panel 220.

Figure 2B:
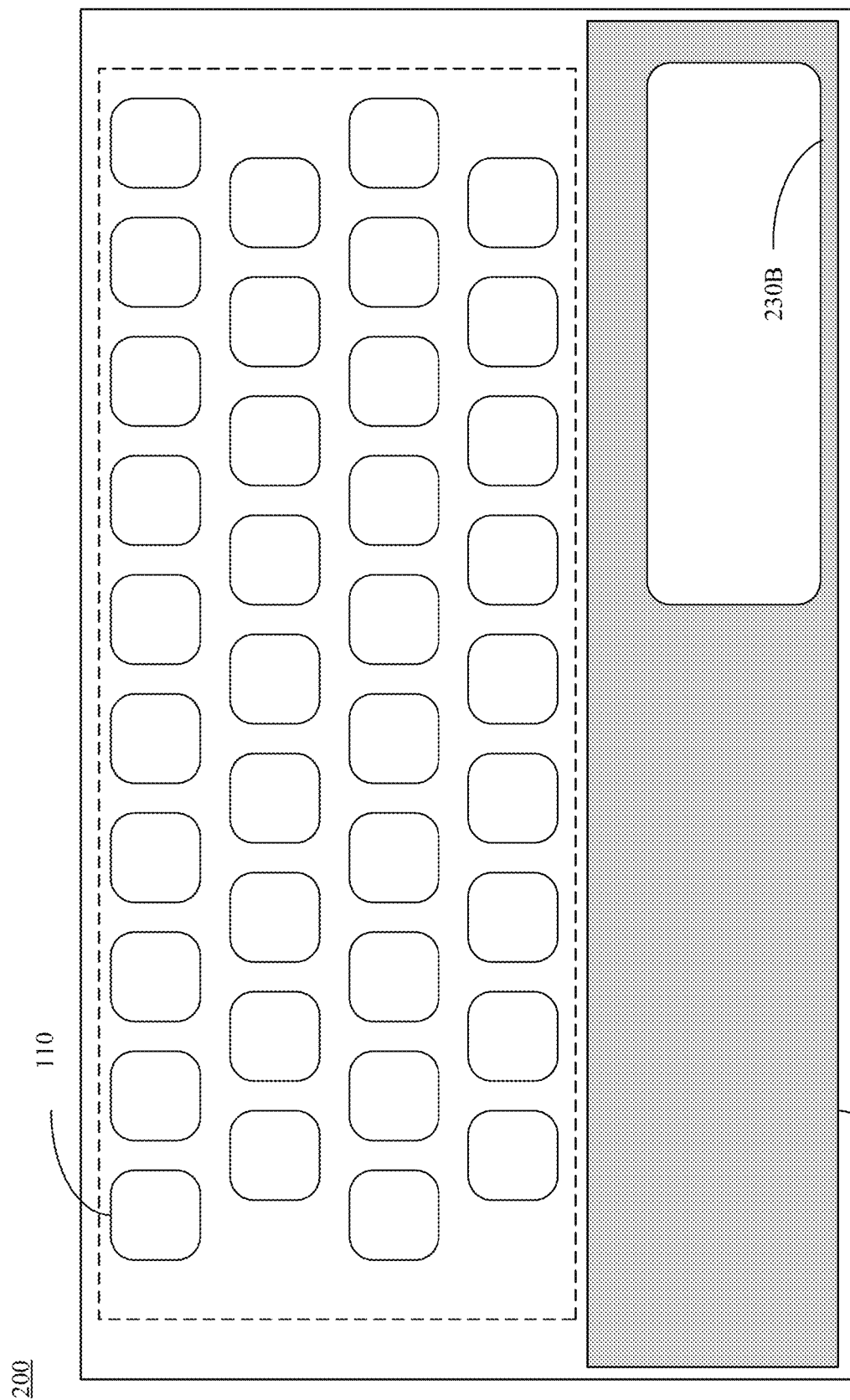
FIG. 2B shows a diagram of the embodiment as shown in FIG. 2A where the rectangular area 230A is changed to a rectangular area 230B.

Please refer to FIG. 2B, which shows a diagram of the embodiment as shown in FIG. 2A where the rectangular area 230A is changed to a rectangular area 230B. As shown in FIG. 2B, the positions, lengths in horizontal axis, lengths in vertical axis, ratios of width and height of the two rectangular areas 230A and 230B are different.

Figure 2C:
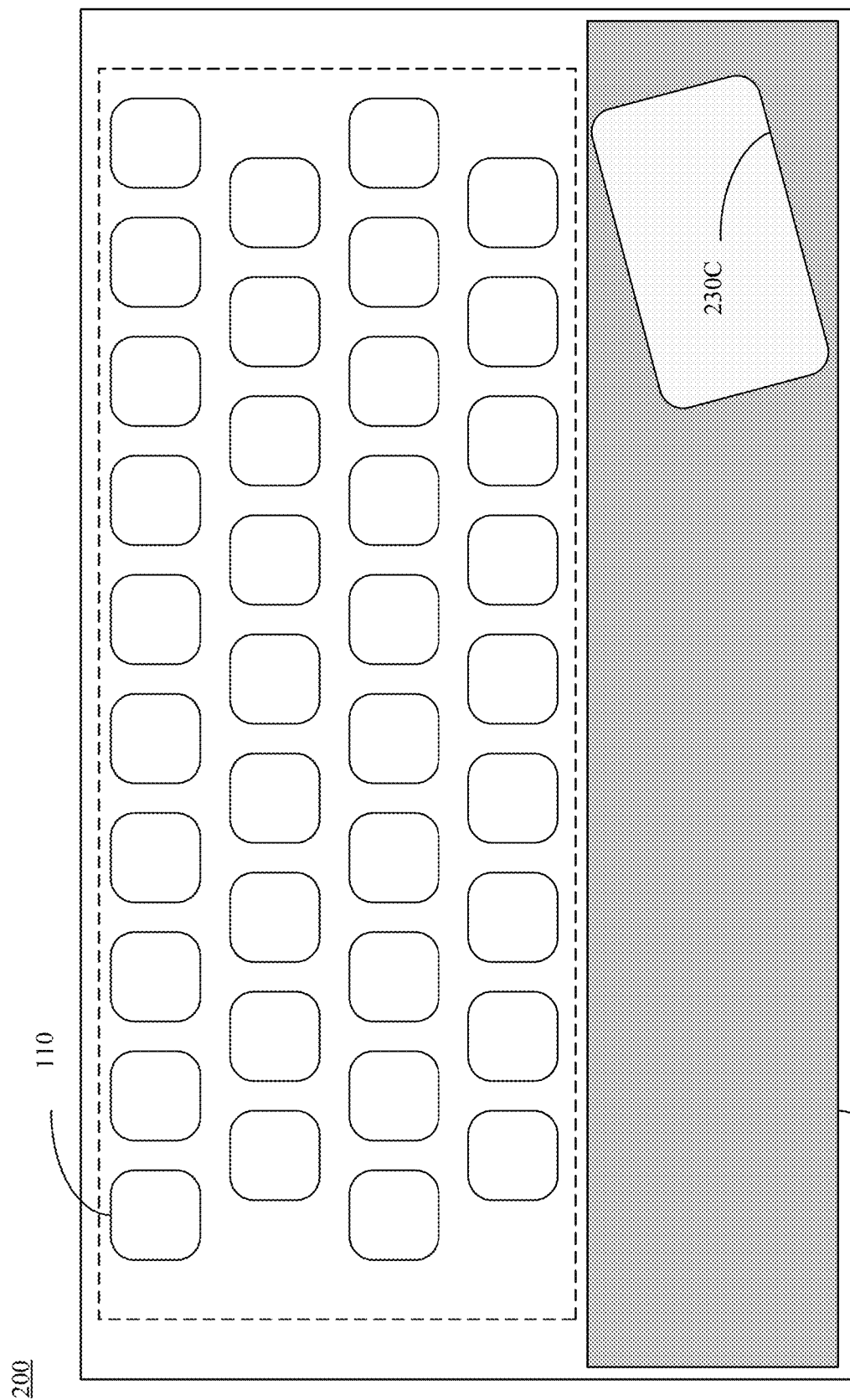
FIG. 2C shows a diagram of the embodiment as shown in FIG. 2A where the rectangular area 230A is changed to a rectangular area 230C.

Please refer to FIG. 2C, which shows a diagram of the embodiment as shown in FIG. 2A where the rectangular area 230A is changed to a rectangular area 230C. As shown in FIG. 2C, the two adjacent edges of the rectangular area 230C are not in parallel to the two adjacent edges of the electronic paper touch panel 220, respectively, because the user may use only his right hand to operate the electronic paper touch panel 220. An angle exists between the long edge of the rectangular area 230C and the long edge of the electronic paper touch panel 220.

Figure 2D:
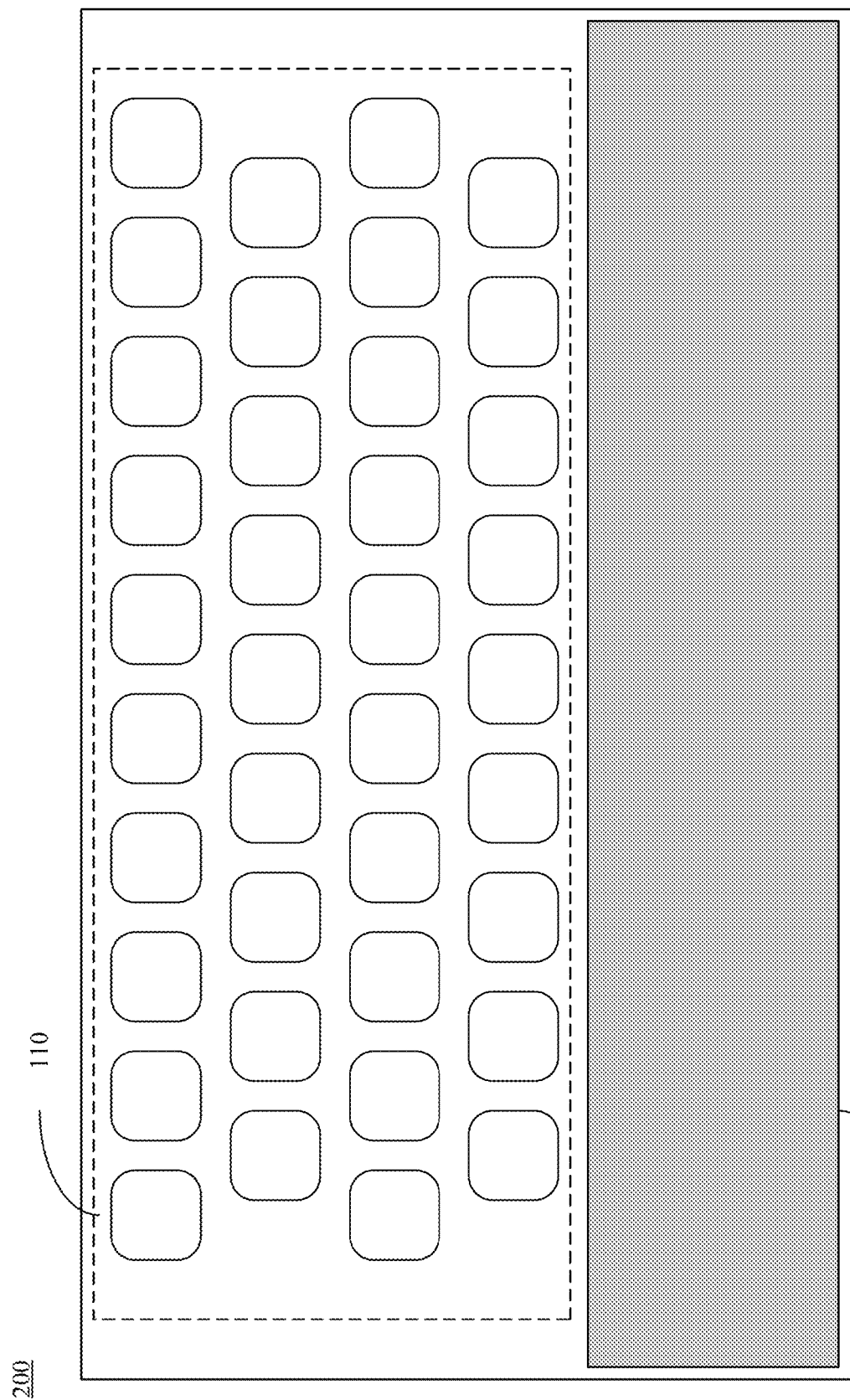
FIG. 2D illustrates a diagram having no rectangular area 230.

Please refer to FIG. 2D, which illustrates a diagram having no rectangular area 230. In the embodiment as shown in FIG. 2D, the rectangular area 230 is cancelled in order to shut down touch sensitive function of the electronic paper touch panel 220.

As described above, parameters of the rectangular area 230 may include a flag to denote whether the rectangular area 230 exists or not, a position, a tilt angle, a length of one edge, a length of adjacent edge, a length ratio between adjacent edges, a representing color in the rectangular area, a representing color outside the rectangular area, a length ratio between an edge of the rectangular area and corresponding edge of the electronic paper touch panel, a length ratio between an adjacent edge of the rectangular area and corresponding adjacent edge of the electronic touch panel as a set of parameters. In one embodiment, the set of parameters corresponding to the rectangular area 230 may be corresponding to the user. For examples, when the user logins in multiple computers, the size and position of the rectangular areas 230 as shown by the computers are designated by the set of parameters corresponding to the user. In an alternative embodiment, when multiple computers having various electronic paper touch panels 220 with different sizes, ratio parameters in the set of parameters may be used to set the position and the size of the rectangular area 230. For example, when the size of an electronic paper touch panel 220 is too small to be configured according to the designated position of the set of parameters, length ratios in the set of parameters may be used to configure the position and the size of the rectangular area 230, e.g., the rectangular area 230 may be disposed in the electronic paper touch panel 220 between locations $1/10 \sim 9/10$ of the horizontal axis and locations between $2/100 \sim 98/100$ of the vertical axis.

The present application does not limit that the touch sensitive area is a rectangular area. The touch sensitive area may be a trapezoid or any quadrilateral shape. An angle between any adjacent edges of the touch sensitive area may be modified as a round angle.

Figure 2E:
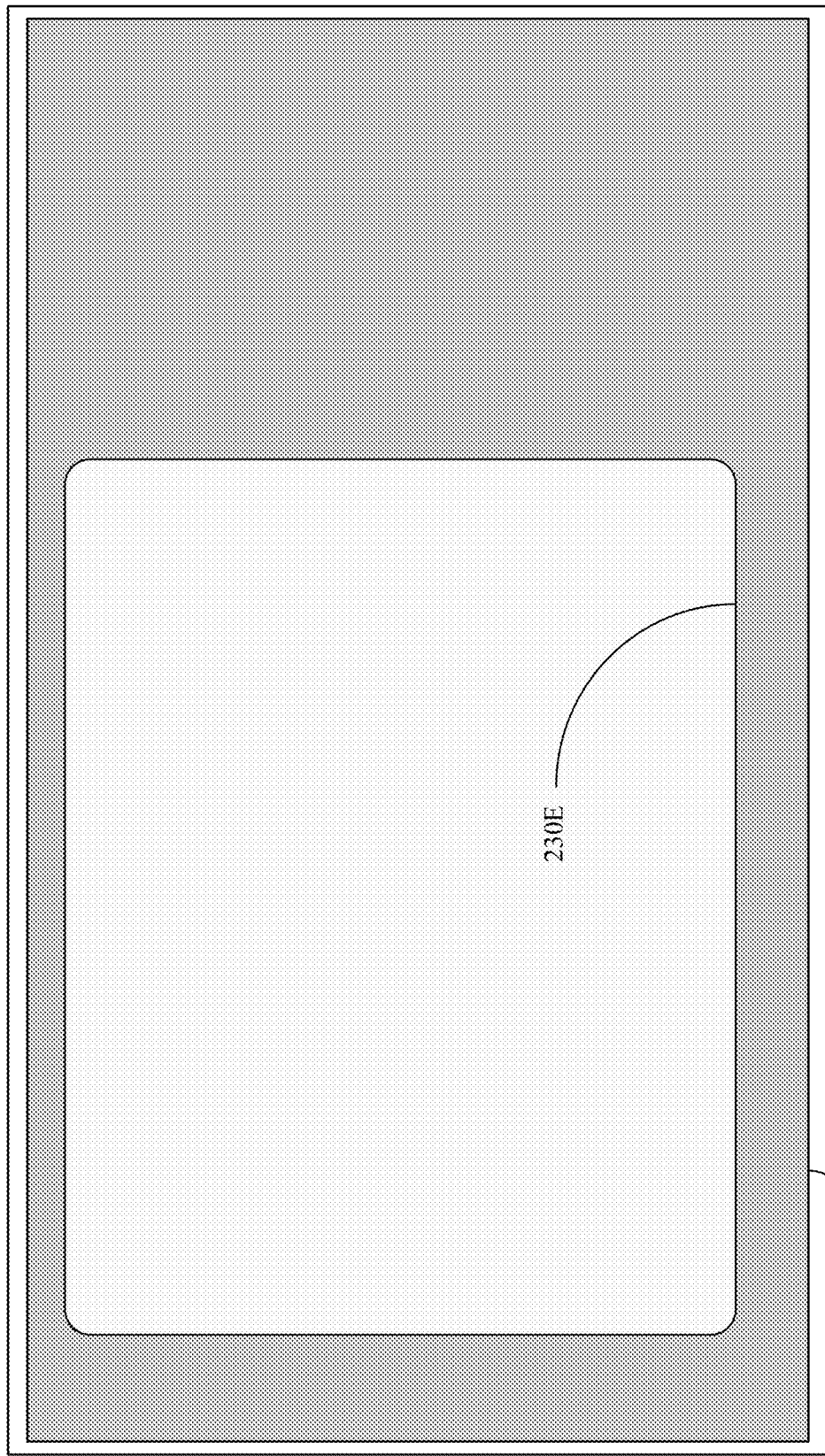
FIG. 2E illustrates a diagram of an input apparatus 200 having no keyboard area 110.

Please refer to FIG. 2E, which illustrates a diagram of an input apparatus 200 having no keyboard area 110. In the embodiments as shown in FIGS. 2A~2D, the keyboard areas 110 are presented, respectively. However, in the embodiment as shown in FIG. 2E, the input apparatus 200 does not include a keyboard area 110 but an electronic paper touch panel 220.

Figure 3A:
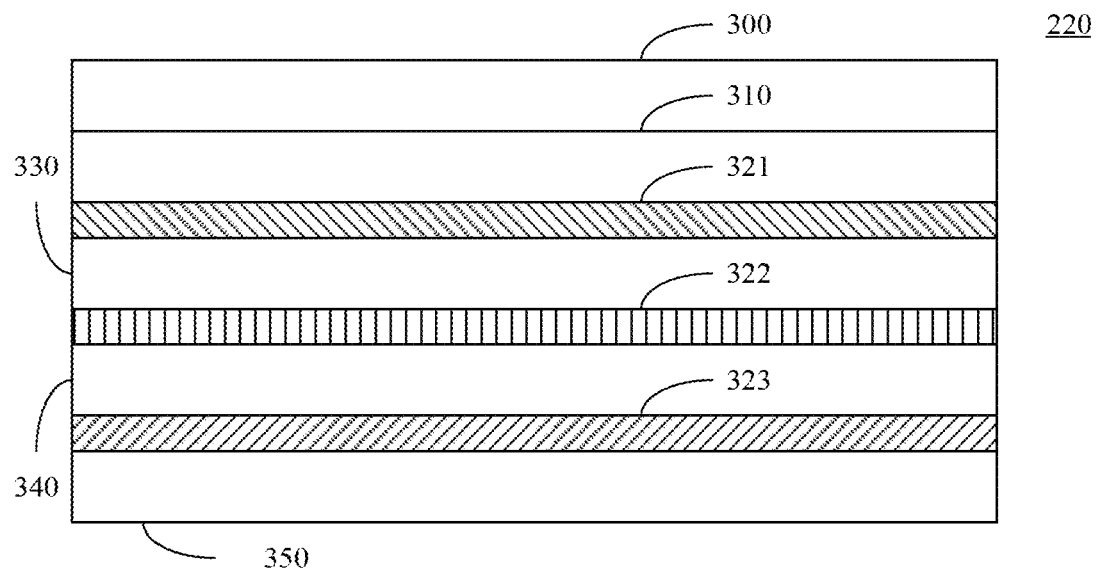
FIG. 3A depicts a profile diagram of an electronic paper touch panel 220 according to an embodiment of the present application.

Please refer to FIG. 3A, which depicts a profile diagram of an electronic paper touch panel 220 according to an embodiment of the present application. In the embodiment as shown in FIG. 3A, it comprises sequentially an electronic paper display 300, a first dielectric layer 310, a layer of first electrodes 321, a second dielectric layer 330, a layer of second electrodes 322, an elastic dielectric layer 340, a layer of third electrodes 323 and a third dielectric layer 350. Persons having ordinary skill in the art can understand that the embodiment as shown in FIG. 3A may omit some layers or components for conveniences.

The electronic paper display 300 may be a currently available black-white two-color or three-color display. A generic structure of the electronic paper display 300 would be mentioned in FIG. 4. The layer of first electrodes 321 comprises multiple first electrodes in parallel to a first axis. Similarly, the layer of second electrodes 322 comprises multiple second electrodes in parallel to a second axis. The layer of third electrodes comprises multiple third electrodes in parallel to the first axis. The first axis may be perpendicular to the second axis. For example, the first axis may be the direction of a longer edge of the surface of the electronic paper touch panel 220; the second axis may be the direction of a shorter edge of the surface of the electronic paper touch panel 220 or vice versa.

In the embodiment as shown in FIG. 3A, the quantity of the first electrodes is identical to the quantity of the third electrodes. They are disposed at corresponding top and bottom positions. It means that an upper intersection between a second electrode and a top first electrode is at a position in the multiple-layer structure corresponding to a lower intersection between the second electrode and a bottom second electrode. In an alternative embodiment, the quantity of the first electrodes may be different to the quantity of the third electrodes. They are not disposed at corresponding top and bottom positions. It means that an intersection between a second electrode and a top first electrode is not at a position in the multi-layer structure corresponding to another intersection between the second electrode and a bottom third electrode.

In the embodiment as shown in FIG. 3A, a mutual capacitance sensing mechanism utilizing the layer of first electrodes 321 and the layer of second electrode 322 is used to detect approaching or touching event. The second electrodes transmit driving signals such that induced signals corresponding to the driving signals are generated by the first electrodes or vice versa. When an external conductive object approaching or touching one of the first electrodes, changes of the induced signals could be detected, then an approaching or touching event could be detected further. During the detecting of approaching or touching events, all of third electrodes of the layer of third electrodes 323 may be coupled to ground potential or a direct current voltage in order to prevent interference. Or the electrodes of the electronic paper display 300 in the rectangular area 230 may be floated in voltage such at the approaching or touching external conductive object can interfere with the induced signals of the first electrodes.

In the embodiment as shown in FIG. 3A, a mutual capacitance sensing mechanism utilizing the layer of second electrodes 322 and the layer of third electrodes 323 is used to detect pressing event. The second electrodes transmit driving signals such that induced signals corresponding to the driving signals are generated by the third electrodes or vice versa. When an external conductive object exerts a downward pressure, the elastic dielectric layer 340 would deform when being pressed. Thus, changes of the induced signals could be detected, then a pressing event could be detected further. During the detecting of pressing event, all of first electrodes of the layer of first electrodes 321 may be coupled to ground potential or a direct current voltage in order to prevent interference. Or the electrodes of the electronic paper display 300 in the rectangular area 230 may be coupled to ground potential or a direct current voltage in order to prevent interference.

Figure 3B:
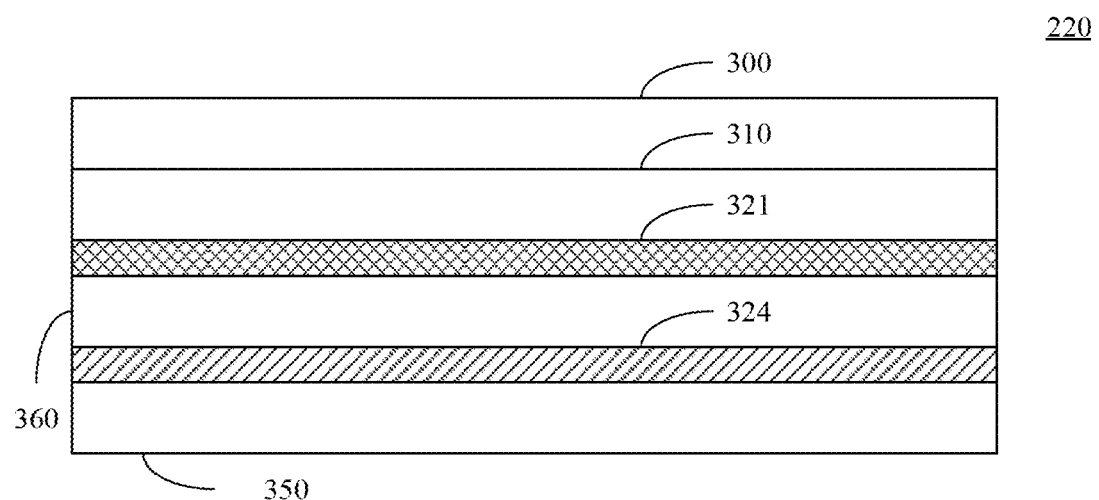
FIG. 3B depicts a profile diagram of an electronic paper touch panel 220 according to an embodiment of the present application.

Please refer to FIG. 3B, which depicts a profile diagram of an electronic paper touch panel 220 according to an embodiment of the present application. In the embodiment as shown in FIG. 3B, it sequentially comprises an electronic paper display 300, a first dielectric layer 310, a layer of first electrodes 321, an elastic dielectric layer 360, a fourth layer of electrodes 324 and a third dielectric layer 350. Persons having ordinary skill in the art can understand that the embodiment as shown in FIG. 3B may omit some layers or components for convenience.

The fourth layer of electrodes 324 comprises multiple second electrodes in parallel to the second axis and multiple third electrodes in parallel to the first axis. Each one of the second electrodes intersects with the multiple third electrodes but they are not coupled. Their intersections form multiple detection areas. Any one of the second electrodes can use bridging circuits to span on the multiple third electrodes, and vice versa.

In the embodiment as shown in FIG. 3B, a mutual capacitance sensing mechanism utilizing the fourth layer of electrodes 324 is used to detect approaching or touching event. The second electrodes transmit driving signals such that induced signals corresponding to the driving signals are generated by the third electrodes or vice versa. When an external conductive object approaching or touching one of the third electrodes, changes of the induced signals could be detected, then an approaching or touching event could be detected further. During the detecting of approaching or touching events, all of first electrodes of the layer of first electrodes 321 may be floated in voltage or the electrodes of the electronic paper display 300 in the rectangular area 230 may be also floated in voltage such at the approaching or touching external conductive object can interfere with the induced signals of the third electrodes.

In the embodiment as shown in FIG. 3B, a mutual capacitance sensing mechanism utilizing the layer of first electrodes 321 and the fourth layer of electrodes 324 is used to detect pressing event. The second electrodes transmit driving signals such that induced signals corresponding to the driving signals are generated by the first electrodes or vice versa. When an external conductive object exerts a downward pressure, the elastic dielectric layer 360 would deform when being pressed. Thus, changes of the induced signals could be detected, then a pressing event could be detected further. During the detecting of pressing event, the electrodes of the electronic paper display 300 in the rectangular area 230 may be coupled to ground potential or a direct current voltage in order to prevent interference.

In one variant of the embodiment as shown in FIG. 3B, positions of the layer of first electrodes 321 and the fourth layer of electrodes 324 are exchanged. In other words, in the variant, the electronic paper touch panel 220 sequentially comprises the electronic paper display 300, the first dielectric layer 310, the fourth layer of electrodes 324, the elastic dielectric layer 360, the layer of first electrodes 321 and the third dielectric layer 350. The fourth layer of electrodes 324 comprises multiple third electrodes in parallel to the first axis and multiple second electrodes in parallel to the second axis.

Figure 4:
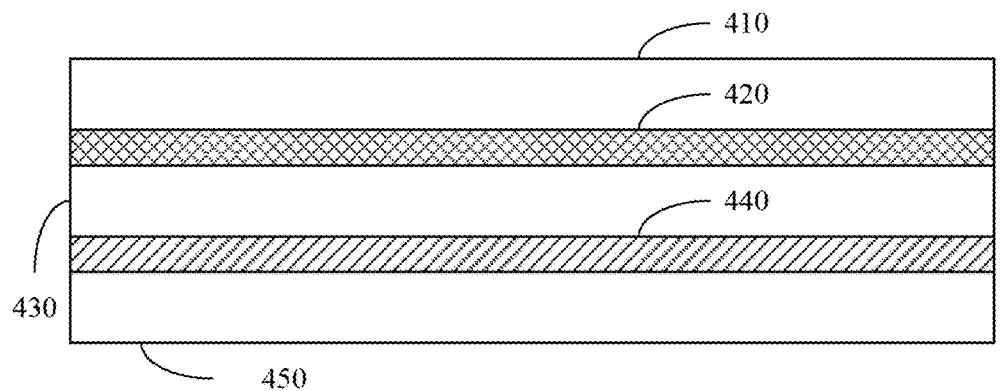
FIG. 4 depicts a profile diagram of an electronic paper display 300 according to an embodiment of the present application.

Please refer to FIG. 4, which depicts a profile diagram of an electronic paper display 300 according to an embodiment of the present application. The electronic paper display 300 may comprises a transparent protection layer 410, a first electronic paper electrode layer 420, a display molecule layer 430, a second electronic paper electrode layer 440 and a protection bottom layer 450. In the embodiments as shown in FIG. 3A and FIG. 3B, the protection bottom layer 450 is closest to the first dielectric layer 310. In one embodiment, the protection bottom layer may be the first dielectric layer 310.

The display molecule layer 430 includes two or more kinds of color molecules or capsules. When a kind of modulated voltage signals is in between corresponding electrodes of the first and the second electronic paper electrodes layer 420 and 440, it controls positions of color molecules or capsules of the display molecule layer 430 in between the two electrodes. When one kind of color molecules or capsules come closer to the transparent protection layer 410, the spot shows the color of this kind.

In the embodiments as shown in FIG. 3A and FIG. 3B, during the detecting of approaching/touching events and pressing events, electrodes of electronic paper corresponding to the rectangular area 230 may be manipulated. In case, during the detecting or approaching/touching events, electrodes of the first electronic paper electrode layer 420 and the second electronic paper electrode layer 440 corresponding to the rectangular area 230 may be floated in voltage. Similarly, during the detecting of pressing events, one or both the electrodes of the first electronic paper electrode layer 420 and the second electronic paper electrode layer 440 corresponding to the rectangular area 230 may be coupled to ground potential or a direct current potential in order to prevent electromagnetic interferences from other components. During the detecting period of approaching/touching events or pressing events, or in intervals between the detecting periods, rest area other than the rectangular area 230 may be display controlled in order to maintain color consistence from being misplacements of molecules or capsules as a result of the rest area being pressed by hand or other objects. Display color in the non-touch area may be maintained in consistence, or image shown in the non-touch area may be maintained. In an example, the electronic paper display 300 may shows a trademark of manufacturer or other figures. After being pressed by hand, the shown trademark or other figures may be disrupted. Therefore, the shown figures in the non-touch area may be refreshed periodically. Besides, the touch electrodes and electrodes of electronic paper display 300 in the non-touch area may be further coupled to ground potential or a direct current potential in order to prevent interference to the detecting in the rectangular area.

Figure 5:
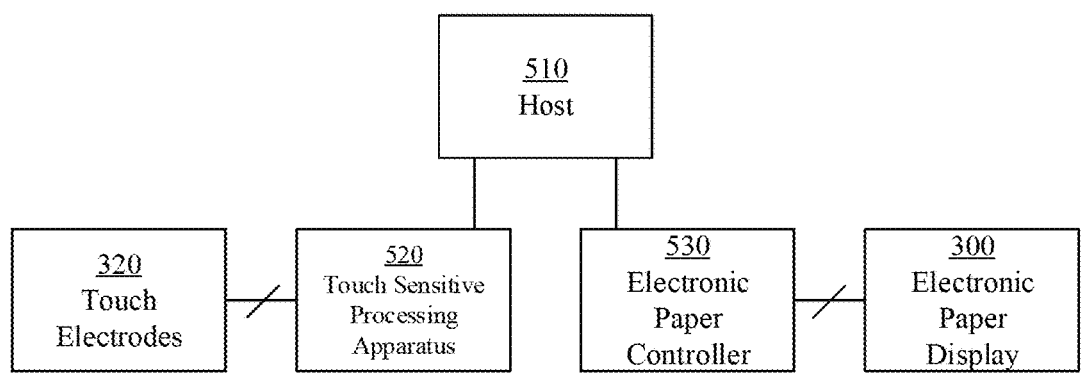
FIG. 5 depicts a block diagram of an electronic system 500 in accordance with an embodiment of the present application.

In order to synchronize the display control and touch detection of the electronic paper touch panel, please refer to FIG. 5, which depicts a block diagram of an electronic system 500 in accordance with an embodiment of the present application. The electronic system 500 includes the aforementioned input apparatus 200 and a host 510, which is configured to execute an operating system and applications for controlling all hardware of the electronic system 500. The electronic system 500 further includes a touch sensitive processing apparatus 520 coupled to the touch electrodes 320 and an electronic paper controller 530 coupled to the electronic paper display 300. The touch sensitive processing apparatus 520 and the electronic paper controller 530 may connect to the host 510 via industrial interfaces such as I2C, PCI, PCI-E, or USB.

The touch electrodes 320 may comprises the multiple first electrodes, the multiple second electrodes and the multiple third electrodes as shown in FIG. 3A and FIG. 3B. The touch sensitive processing apparatus 520 is capable to use the aforementioned touch electrodes 320 to detect approaching/touching events and pressing events in the rectangular area 230. However, since the touch sensitive processing apparatus 520 cannot control operations of the electronic paper display 300, the host 510 must execute a driver program to control the touch sensitive processing apparatus 520 and the electronic paper controller 530.

In the embodiment, the touch sensitive processing apparatus 520 and the electronic paper controller 530 may trigger the host 510 to execute the driver program to handle a control request via hardware or software interrupt signals. These interrupt signals would increase input/output burdens of the host. Please refer to FIG. 6, which depicts a block diagram of an electronic system 600 in accordance with an embodiment of the present application. The electronic system 600 includes an integrated apparatus 620 to replace the touch sensitive processing apparatus 520 and the electronic paper controller 530. The integrated apparatus 620 is coupled to the touch electrodes 320 and the electronic paper display 300 to execute the control steps coordinately without intervene of the driver program executed by the host 510.

Figure 7:
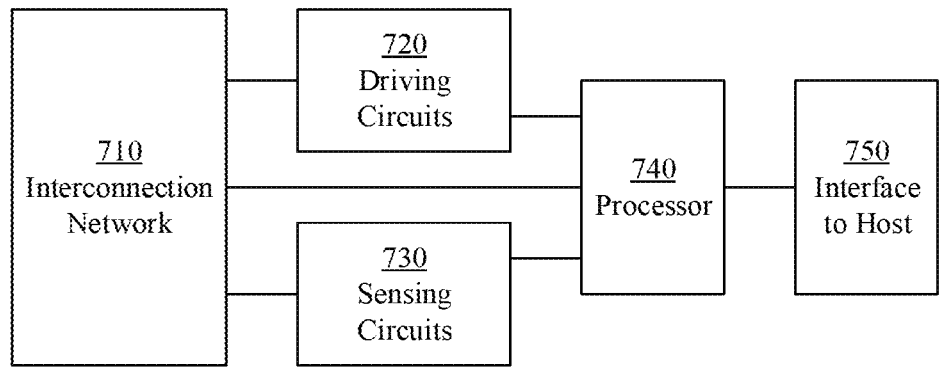
FIG. 7 illustrates a block diagram of a touch sensitive processing apparatus 520 in accordance with an embodiment of the present application.

Please refer to FIG. 7, which illustrates a block diagram of a touch sensitive processing apparatus 520 in accordance with an embodiment of the present application. The touch sensitive processing apparatus 520 comprises an interconnection network 710, a driving circuit 720, a sensing circuit 730, a processor 740 and an interface module 750.

The touch sensitive processing apparatus 520 may be implemented inside a single integrated circuit which may include one or more chips. It may use multiple integrated circuits and an interconnected circuit board carried the multiple integrated circuits to realize the touch sensitive processing apparatus 520. The touch sensitive processing apparatus 520 may be implemented in single integrated circuits with the host 510. The present application does not limit how to implement the touch sensitive processing apparatus 520.

The interconnection network 710 is configured to connect each of the multiple first electrodes, the multiple second electrodes and/or the third electrodes. The interconnection network 710 may follow control command of the processor 740 for connecting the driving circuit 720 and any one or more touch electrodes and for connecting the sensing circuit 730 and any one or more touch electrodes. The interconnection network 710 may include a combination of one or more multiplexers (MUX) to realize the aforementioned functions.

The driving circuit 720 may comprise clock generator, frequency divider, frequency multiplier, phase lock loop, power amplifier, DC-DC voltage converter, regulator and/or filter, which is configured to provide driving signal to any one or more touch electrodes via the interconnection network 710 according to control commands of the processor 740. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit 720 may include one or more channel. Each channel may be connected to any one or more touch electrodes via the interconnection network 710.

The sensing circuit 730 may comprise integrator, sampler, clock generator, frequency divider, frequency multiplier, phase lock loop, power amplifier, DC-DC voltage converter, regulator and/or filter, which is configured to sense on any one or more touch electrodes via the interconnection network 710 according to control commands of the processor 740. When the touch signal is transmitted from one of the touch electrodes, another touch electrode may induce the touch signal. And the sensing circuit 730 may demodulate the induced touch signal by the another touch electrode in accordance with the modulation method performed on the driving signal by the driving circuit 720 in order to restore the messages carried by the driving signal. The sensing circuit 730 may include one or more channels. Each channel may be connected to any one or more touch electrodes via the interconnection network 710. In the same time, each channel may simultaneously perform sensing and demodulation.

In one embodiment, the driving circuit 720 and the sensing circuit 730 may include analog front-end (AFE) circuits. In another embodiment, in additional to the AFE circuits, the driving circuit 720 and the sensing circuit 730 may include digital back end (DBE) circuits. If the driving circuit 720 and the sensing circuit 730 include only the AFE circuits, the DBE circuits may be implemented in the processor 740.

The processor 740 may include a digital signal processor for connecting the AFE circuits or the DBE circuits of the driving circuit 720 and the sensing circuit 730, respectively. The processor 740 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network 710, the driving circuit 720, the sensing circuit 730 and the interface module 750 of the touch sensitive processing apparatus 520. For examples, the processor 740 may comprises processors widely adopted in the industry such as 8051 series, Intel i960 series, ARM Cortex-M series and etc. The present application does not limit types and numbers of processor cores included in the processor 740.

The instructions and data may be used to implement each of steps mentioned in the present application and flows and methods constructed by the steps. Some instructions may be executed independently inside the processor 740, for examples, arithmetic and log operation instructions. Other instructions may be used to control other circuits of the touch sensitive processing apparatus 520. These instructions may include input/output interfaces of the processor 740 to control other circuits. Other circuits may provide information via the input/output interface of the processor 740 to the OS and/or application programs executed by the processor 740. Persons having ordinary skill in the art should have common knowledge of computer organization and architecture which enabling them to understand that the flows and methods provided by the present application can be realized by the circuits and the instructions.

The interface module 750 may include kinds of serial or parallel bus, such as universal serial bus (USB), I$^2$C, peripheral component interconnect (PCI), PCI-Express, IEEE 1394 and other industrial standard input/output interface. The touch sensitive processing apparatus 520 connects to the host 510 via the interface module 750.

The interconnection network 710 is configured to receive commands from the processor 740 for connecting one or more touch electrodes 320 to the driving circuit 720 or the sensing circuit 730. The software executed by the processor 740 or the hardware of the processor 740 may have the driving circuit 720 and the sensing circuit 730 performing the mutual capacitance sensing to detect approaching/touching events and pressing events in the rectangular area 230. Besides, it may have the touch electrodes 320 coupled to a ground potential or a direct current voltage in order to prevent interferences to the touch sensitive detections in the rectangular area 230.

Prior to the detections of approaching/touching events or pressing events, the processor 740 may notify the driver program run by the host 510 via the interface module 750. The driver program may command the electronic paper controller 530 to control voltage on the corresponding electrodes of the electronic paper display 300.

During the detections of approaching/touching events or pressing events, the processor 740 may notify the driver program run by the host 510 via the interface module 750. The driver program may command the electronic paper controller 530 to perform display control to the electronic paper display 300 such that a color is shown in the rectangular area 230 and another color is shown in the rest area.

Figure 8:
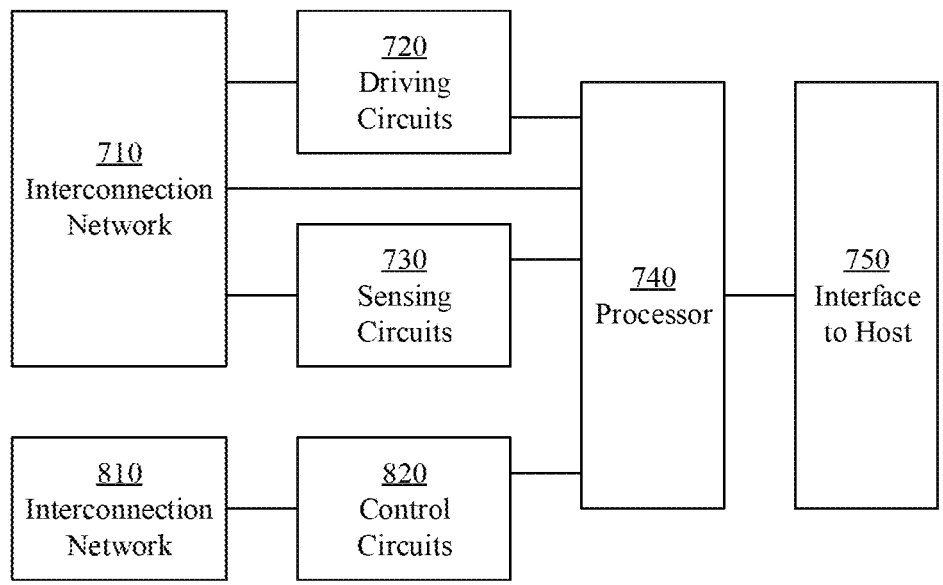
FIG. 8, which illustrates a block diagram of an integrated apparatus 620 in accordance with an embodiment of the present application.

Please refer to FIG. 8, which illustrates a block diagram of an integrated apparatus 620 in accordance with an embodiment of the present application. Similar to the touch sensitive processing apparatus 520, the integrated apparatus 620 also comprises the interconnection network 710, the driving circuit 720, the sensing circuit 730, the processor 740 and the interface module 750. However, in order to control the electronic paper display 300, the integrated apparatus 620 further comprises a second interconnection network 810 and a control circuit 820. The second interconnection network 810 may connect one or more electrodes of the electronic paper display 300 to the control circuit 820. The software executed by the processor 740 or the hardware of the processor 740 may control the second interconnection network 810 and the control circuit 820 for configuring voltage of each of the electrodes of the electronic paper display 300.

Prior to the detections of approaching/touching events or pressing events, the processor 740 itself may command the second interconnection network 810 and the control circuit 820 to configure voltage of the corresponding electrodes. During the detections of approaching/touching events or pressing events, the processor 740 itself may perform display control such that a color is shown in the rectangular area 230 and another color is shown in the rest area.

Figure 6:
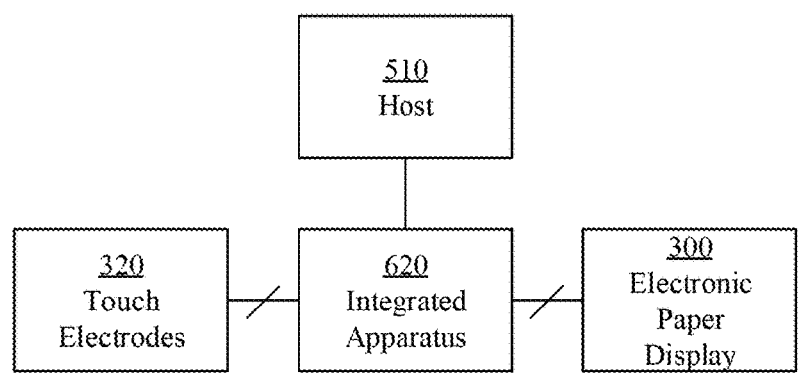
FIG. 6 depicts a block diagram of an electronic system 600 in accordance with an embodiment of the present application.

In the embodiment as shown in FIG. 5, after the host 510 boots up, the driver program corresponding to the input apparatus 200 would command the touch sensitive processing apparatus 520 and the electronic paper 530 to set up the rectangular area 230. In the embodiment as shown in FIG. 6, after the host 510 boots up, the driver program corresponding to the input apparatus 200 would command the integrated apparatus 620 to set up the rectangular area 230. If no user logins the host 510, it may use a default set of parameters to set up the rectangular area 230. When a user logins the host 510, it may use a set of parameters corresponding to the user to set up the rectangular area 230.

As discussed above, the user may use various methods to set up all or some parameters. For example, the user may directly input two APT events on the electronic paper touch panel 220 simultaneously or in different times. The driver program corresponding to the input apparatus 200 may use the coordinates of these two APT events as two diagonal vertexes of the rectangular area. In an embodiment, prior to the inputs of these two APT events, the user may input a specified gesture in the original rectangular area. When the processor 740 of the touch sensitive processing apparatus 520 or the integrated apparatus 620 detect the specified gesture, it may command the touch sensitive processing apparatus 520 or the integrated apparatus 620 switching into a setup mode.

After being into the setup mode, the touch sensitive processing apparatus 520 or the integrated apparatus 620 may stop reporting points to the host 510 until the set up mode is finished. When in the setup mode, the driver program may command the electronic paper controller 530 to show a set up animation or a prompt on the electronic paper display 300. The purpose of the setup animation or the prompt is to notify the user that the input apparatus 200 or the electronic paper touch panel 220 is already switched into the setup mode.

For examples, it may command the electronic paper display 300 to show a prompt message in the rectangular area 230, to have a part or all of the rectangular area 230 blinking, to have a part or all of the non-rectangular area blinking, to have a part or all boundary lines of the rectangular area 230 blinking, to have rest area other than the rectangular area blinking, showing text messages or other animated patterns. The specified visual effects in the setup mode is usually used to mark the boundary of the rectangular area 230 and to notify the user that it is currently in the setup mode.

In one embodiment, the user may "drag" to move the rectangular area 230. With no changes to the shape and the size of the rectangular area, a finger is used to move the position of the rectangular area. Since the display update of the electronic paper display 300 is not fast, the movement of the rectangular area 230 is moved by a fixed range in one time. For example, the rectangular area 230 may move a N-pixel distance in the horizontal axis and move a M-pixel distance in the vertical axis in one time, where N and M are positive integers. When the rectangular area 230 is moving, the change area unit of the electronic paper display 300 is not in a pixel but in a N×M pixel area.

In an alternative embodiment, the user may use two fingers pinch or unpinch gestures to configure the size and the position of the rectangular area 230. For example, two APT events corresponding to the two fingers, respectively, represent two diagonal vertexes of the rectangular area 230. Or using the distance between two APT events corresponding to the two fingers, respectively, to represent the distance of two diagonal vertexes of the rectangular area 230 while the central point of the rectangular area 230 is fixed. Similarly, the distance may be increased or decreased in a N-pixel or a M-pixel distance in one time.

In an alternative embodiment, the user may use single finger to drag an edge of the rectangular area 230. Similarly, the edge may be move in a N-pixel or a M-pixel distance in one time.

In order to prevent the rectangular area is accidentally set too small such that it is unable to be recovered by the user, it may automatically restore the previous set of parameters when the size of the rectangular area 230 is too small or when the length of an edge is too short.

In order to reduce the user's difficulty in set up or in order to fully utilize the short axis area of the electronic paper touch panel 220, it may allow the user to set up a length or a position of the edge, in parallel to the horizontal axis or one axis, of the rectangular area 230. The length and the position of the edge in parallel to another axis or the vertical axis of the rectangular area 230 is fixed.

In some embodiments, the width height aspect of the rectangular area 230 is corresponding to the width height aspect of a main display. Thus, the user may not configure the width height aspect of the rectangular area 230. When the length of an edge is changed by the user, length of its adjacent edges would be changed automatically.

In the embodiment as shown in FIG. 6, the integrated apparatus 620 may execute the discussed setup method by itself if the driver program of the host 510 is notified prior to switch into the setup mode. And after leaving the setup mode, the updated set of parameters is sent to the driver program of the host 510. However, in the embodiment as shown in FIG. 5, it is the driver program of the host 510 to control the touch sensitive processing apparatus and the electronic paper 530 to realize the setup method.

In one embodiment, there may exist multiple light sources or light wave guide mechanisms surrounding or underneath the electronic paper display 300 for providing illumination. It may turn on the light sources or light wave guide mechanisms underneath or surrounding the rectangular area 230 to further indicate the position of the rectangular area 230.

Figure 9:
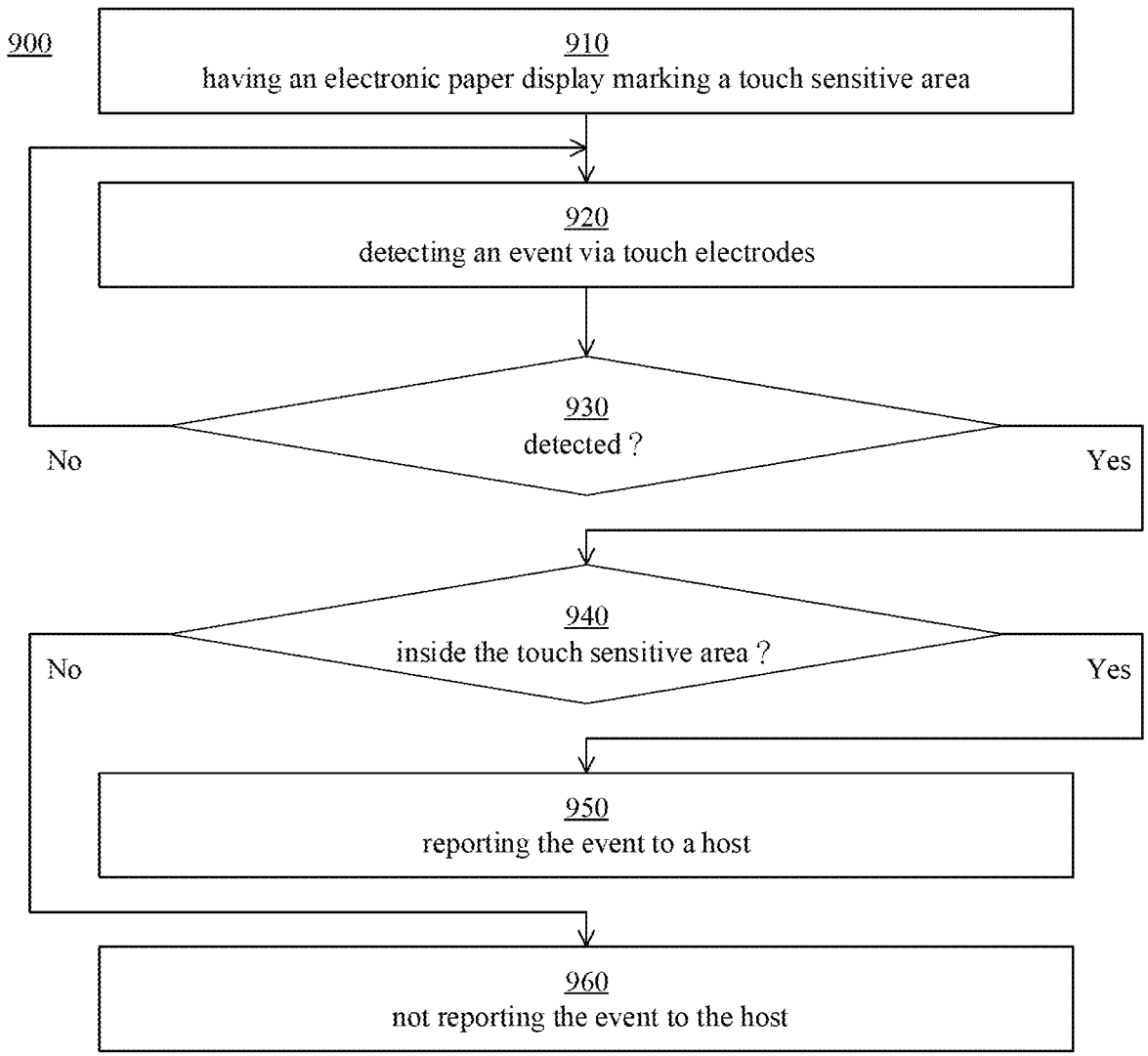
FIG. 9, which depicts a flowchart diagram of a control method for electronic paper touch panel in accordance with an embodiment of the present application.

Please refer to FIG. 9, which depicts a flowchart diagram of a control method for electronic paper touch panel in accordance with an embodiment of the present application. The control method 900 may be applicable to the electronic system 700 or the electronic system 800. The control method 900 may begin with step 910.

Step 910: having an electronic paper display marking a touch sensitive area. The touch sensitive area may be said rectangular area 230 or an area with any other shape. The touch sensitive area may be set up according to a default set of parameters or according to a set of parameters corresponding to a user. This step 910 may comprise one or any combination of followings: having the electronic paper display showing one color inside the touch sensitive area and showing another color outside the touch sensitive area; having the electronic paper display showing one illumination grade inside the touch sensitive area and showing another illumination grade outside the touch sensitive area; and having the electronic paper display showing a graph outside the touch sensitive area.

Step 920: detecting an event via touch electrodes. The detecting steps in the embodiments as shown in FIG. 3A or 3B of the present application may be used to detect an approaching event, a touching event and/or pressing event. The so-called event in this step may be one or any combination of the mentioned approaching event, touching event and the pressing event.

Step 930: determining whether an event is detected. When no event is detected, the flow returns to step 920. When an event is detected, the flow proceeds to step 940.

Step 940: determining whether the event occurred inside the touch sensitive area. When the event did occur inside the touch sensitive area, the flow proceeds to step 950; otherwise, the flow proceeds to step 960.

Step 950: reporting the event to a host.

Step 960: not reporting the event to the host.

Figure 10:
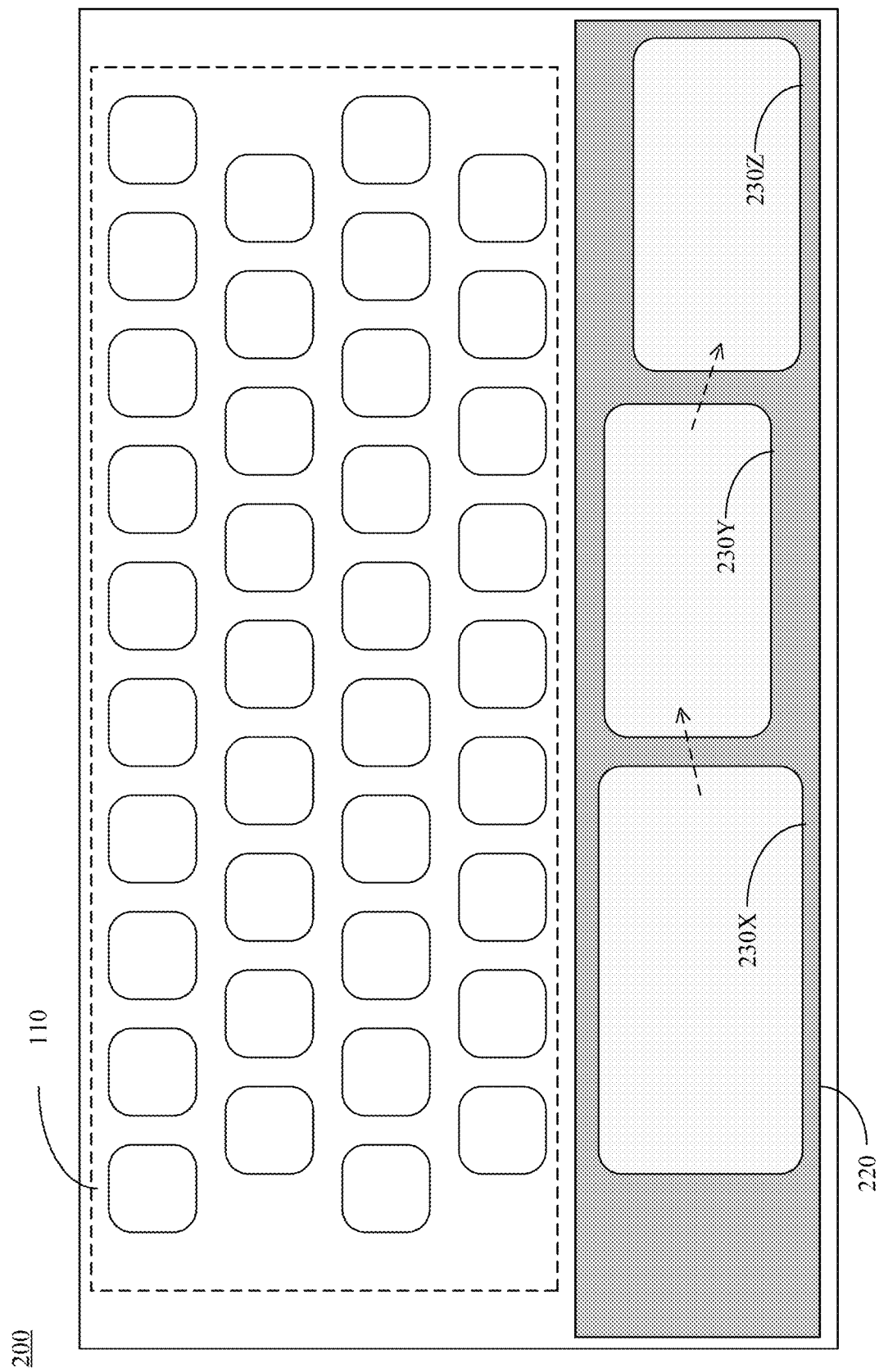
FIG. 10, which depicts a diagram of a situation regarding to set up a touch sensitive area of the electronic paper touch panel in accordance with the present application.

Please refer to FIG. 10, which depicts a diagram of a situation regarding to set up a touch sensitive area of the electronic paper touch panel in accordance with the present application. The embodiment as shown in FIG. 10 includes touch sensitive areas 230X, 230Y and 230Z. Sizes and shapes of the areas 230Y and 230Z are identical. However, they are arranged at different positions. The position and the size of the area 230X are different from those of the other two areas 230Y and 230Z.

When a user intends to adjust the first touch sensitive area 230X, it may enter a setup mode. The electronic paper display would highlight the adjusting touch sensitive area in a different display format. The user may use pinch and un-pinch gestures to adjust the position and/or the size of touch sensitive area, as the temporary third touch sensitive area 230Y. Following that, the user may use a drag gesture by one single finger to adjust the position of touch sensitive area, as the last second touch sensitive area 230Z. The user may directly adjust in one time from the first touch sensitive area 230X to the last second touch sensitive area 230Z. The temporary third touch sensitive area 230Y is not always required. However, it is possible for the user to have multiple temporary touch sensitive areas 230Y in the adjustment process and to have the last second touch sensitive area 230Z.

When the user is satisfied with the adjusting touch sensitive area, a command for exiting the setup mode may be given or the user has no inputs to the electronic paper touch panel in a time period. Thus, the electronic paper touch panel can assign the last touch sensitive area as a new touch sensitive area and recovers to a normal display format.

Please refer to FIG. 11, which depicts a flowchart diagram of a method 1100 for setup a touch sensitive area in accordance with an embodiment of the present application. When being applicable to the embodiment as shown in FIG. 5, the method 1100 may be implemented by a driver program executed by the host. When being applicable to the embodiment as shown in FIG. 6, the method 1100 may be implemented by the processor contained in the integrated apparatus.

Optional step 1105: notifying a host into a setup mode. Next, the flow proceeds to step 1110.

Step 1110: having an electronic paper display to mark an initial touch sensitive area in a first display format. In the embodiment as shown in FIG. 10, the initial touch sensitive area is designated as the first touch sensitive area 230X. The first display format may be having a corresponding area blinking periodically; having edges of the corresponding area blinking periodically; showing graph or text inside the corresponding area; or having graph or text inside the corresponding area blinking periodically.

Step 1120: as the same as step 920, detecting an event via touch electrodes.

Step 1130: determining whether an event is detected. If so, the flow proceeds to step 1140; otherwise, the flow proceeds to step 1160.

Step 1140: setting up a temporary touch sensitive area according to the detected event(s). In the embodiment as shown in FIG. 10, the temporary touch sensitive area may be referred to the touch sensitive area 230Y or 230Z. In order to adapt to slow refresh characteristics of the electronic paper display, movement of the touch sensitive area may be in a step of an integer multiple of N pixels with regard to a first axis and in a step of an integer multiple of M pixels in a second axis, where N and M are positive integers larger than 1. The pixel herein is referred to pixels of the electronic paper display. In order to prevent the touch sensitive area is set undersized, the size of the touch sensitive area cannot be less than a predetermined area size or a length of any edge cannot be less than a predetermined length. The step may further comprise one of following steps: when only one event is detected, determining a position of the temporary touch sensitive area according to the one detected event; and when two events are detected, determining a position and/or a size of the temporary touch sensitive area according to the two detected events.

Step 1150: having the electronic paper display marking the temporary touch sensitive area in the first display format. Next, the flow returns to step 1120.

Step 1160: determining whether no event has been detected for a predetermined times or whether a command for exiting the setup mode is received. When the determination result is positive, the flow proceeds to step 1170; otherwise, the flow returns to step 1120.

Step 1170: setting the temporary touch sensitive area as a new touch sensitive area.

Step 1180: reporting the new touch sensitive area to the host and exiting the setup mode.

According to one embodiment of the present application, a control method for an electronic paper touch panel is provided. The control method comprising: having an electronic paper display of the electronic paper touch panel marking a touch sensitive area; detecting an event corresponding to an external object via multiple touch electrodes of the electronic paper touch panel; when the event is detected, determining whether a position of the event is inside the touch sensitive area; when it is determined that the position of the event is inside the touch sensitive area, reporting the event to a host; and when it is determined that the position of the event is outside the touch sensitive area, not reporting the event to the host.

Preferably, in order to prevent interference to or from the underneath of the electronic paper touch panel, the multiple touch electrodes sequentially comprise first electrodes in parallel to a first axis, second electrodes in parallel to a second axis, and third electrodes in parallel to the first axis, wherein a distance between the third electrodes and the electronic paper display is larger than a distance between the first electrodes and the electronic paper display, wherein the detecting is realized by mutual-capacitance sensing between the first electrodes and the second electrodes and coupling the third electrodes to ground voltage or a direct current voltage. Preferably, in order to increase probability and sensitivity of the detecting, the detecting further comprises having electrodes of the electronic paper display corresponding to the touch sensitive area floating in voltage.

Preferably, in order to detect pressing events, the electronic paper touch panel further comprise an elastic dielectric layer between the second electrodes and the third electrodes, the detecting is further realized by mutual capacitance sensing between the second electrodes and the third electrodes. Preferably, in order to prevent interference, the detecting further comprises coupling the first electrodes to ground voltage or a direct current voltage.

Preferably, in order to detect an event, the touch electrodes sequentially comprise first electrodes in parallel to a first axis, second electrodes in parallel to a second axis, and third electrodes in parallel to the first axis, wherein the second electrodes and the third electrodes are disposed in one electrode layer, wherein the detecting is realized by mutual capacitance sensing between the second electrodes and the third electrodes. Preferably, in order to increase probability and sensitive of the detecting, the detecting further comprises having electrodes of the electronic paper display corresponding to the touch sensitive area floating in voltage. Preferably, in order to increase probability and sensitive of the detecting, the detecting further comprises having first electrodes floating in voltage.

Preferably, in order to detect pressing events, the electronic paper touch panel further comprises an elastic dielectric layer between the first electrodes and the second electrodes, the detecting is further realized by mutual capacitance sensing between the first electrodes and the second electrodes. Preferably, in order to prevent interference, the detecting further comprises coupling electrodes of the electronic paper display corresponding to the touch sensitive area to ground voltage or a direct current voltage.

Preferably, in order to clearly highlight the touch sensitive area, the control method further comprises one or any combination of following: having the electronic paper display showing a color inside the touch sensitive area and showing another color outside the touch sensitive area; having the electronic paper display showing an illumination grade inside the touch sensitive area and showing another illumination grade outside the touch sensitive area; and having the electronic paper display showing a graph outside the touch sensitive area.

Preferably, in order to provide complete user input functions, the touch sensitive display further comprises a keyboard area, the keyboard area consists of multiple keys, the keyboard area is farther away from a user than the touch sensitive area.

Preferably, in order to provide similar configurations in multiple computers for a user, the control method further comprises reading a set of parameters corresponding to a user and setting up a position and a size of the touch sensitive area according to the set of parameters; and when the set of parameters corresponding to a user cannot be read, setting up the position and the size of the touch sensitive area according to a default set of parameters.

Preferably, in order to provide similar configurations in multiple computers having different sized electronic paper touch panel for a user, a position and a shape of the touch sensitive area are configured corresponding to proportional positions regarding to an edge and its adjacent edge and a ratio between the edge and the adjacent edge, respectively.

Preferably, in order to let a user to manipulate touch control in his/her dominate hand, the touch sensitive area comprises an edge which is not in parallel to any edge of the touch sensitive touch panel.

According to an embodiment of the present application, an electronic system is provided. The electronic system comprising: an electronic paper touch panel, a touch sensitive processing apparatus, an electronic paper controller; and a host connected with the touch sensitive processing apparatus and the electronic paper controller. The electronic paper controller is configured for having an electronic paper display of the electronic paper touch panel marking a touch sensitive area. The touch sensitive processing apparatus further comprising: an interconnection network, for connecting with touch electrodes of the electronic paper touch panel, respectively; a driving circuit, for connecting with the interconnection network; a sensing circuit, for connecting with the interconnection network; an interface module for connecting with the host; and a processor, for executing instructions stored in a non-volatile memory for: having the driving circuit, the sensing circuit and the interconnection network for detecting an event corresponding to an external object via multiple touch electrodes of the electronic paper touch panel; when the event is detected, determining whether a position of the event is inside the touch sensitive area; when it is determined that the position of the event is inside the touch sensitive area, reporting the event to the host; and when it is determined that the position of the event is outside the touch sensitive area, not reporting the event to the host.

Preferably, in order to prevent interference to and from the underneath of the electronic paper touch panel, the multiple touch electrodes sequentially comprise first electrodes in parallel to a first axis, second electrodes in parallel to a second axis, and third electrodes in parallel to the first axis, wherein a distance between the third electrodes and the electronic paper display is larger than a distance between the first electrodes and the electronic paper display, wherein the detecting is realized by the driving circuit, the sensing circuit and the interconnection network implementing mutual-capacitance sensing between the first electrodes and the second electrodes and coupling the third electrodes to ground voltage or a direct current voltage. Preferably, in order to increase probability and sensitivity of the detecting, the detecting further comprises that the electronic paper controller lets electrodes of the electronic paper display corresponding to the touch sensitive area floating in voltage.

Preferably, in order to detect pressing events, the electronic paper touch panel further comprise an elastic dielectric layer between the second electrodes and the third electrodes, the detecting is further realized by the driving circuit, the sensing circuit and the interconnection network implementing mutual capacitance sensing between the second electrodes and the third electrodes. Preferably, in order to prevent interference, the detecting further comprises c that the electronic paper controller lets coupling electrodes of the electronic paper display corresponding to the touch sensitive area to ground voltage or a direct current voltage.

Preferably, in order to clearly highlight the touch sensitive area, the electronic paper controller is further configured for one or any combination of following: having the electronic paper display showing a color inside the touch sensitive area and showing another color outside the touch sensitive area; having the electronic paper display showing an illumination grade inside the touch sensitive area and showing another illumination grade outside the touch sensitive area; and having the electronic paper display showing a graph outside the touch sensitive area.

Preferably, in order to provide complete user input function, the electronic paper controller is further configured for having the touch sensitive display shows a keyboard area, the keyboard area consists of multiple keys, the keyboard area is farther away from a user than the touch sensitive area.

Preferably, in order to provide similar configurations in multiple computers for a user, the host is further configured for: reading a set of parameters corresponding to a user and setting up a position and a size of the touch sensitive area according to the set of parameters; and when the set of parameters corresponding to a user cannot be read, setting up the position and the size of the touch sensitive area according to a default set of parameters.

Preferably, in order to provide similar configurations in multiple computers having different sized electronic paper touch panel for a user, a position and a shape of the touch sensitive area are configured corresponding to proportional positions regarding to an edge and its adjacent edge and a ratio between the edge and the adjacent edge, respectively.

Preferably, in order to let a user to manipulate touch control in his/her dominate hand, the touch sensitive area comprises an edge which is not in parallel to any edge of the touch sensitive touch panel.

According to an embodiment of the present application, an integrated apparatus for controlling an electronic paper touch panel is provided. The integrated apparatus comprising: an interconnection network, for connecting with touch electrodes of the electronic paper touch panel, respectively; a driving circuit, for connecting with the interconnection network; a sensing circuit, for connecting with the interconnection network; an interface module for connecting with a host; a second interconnection network, for connecting with electrodes of an electronic paper display of the electronic paper touch panel, respectively; a control circuit, for connecting with the second interconnection network; a processor, for executing instructions stored in a non-volatile memory for: having the control circuit to make the electronic paper display marking a touch sensitive area via the second interconnection network; having the driving circuit, the sensing circuit and the interconnection network for detecting an event corresponding to an external object via the touch electrodes of the electronic paper touch panel; when the event is detected, determining whether a position of the event is inside the touch sensitive area; when it is determined that the position of the event is inside the touch sensitive area, reporting the event to the host; and when it is determined that the position of the event is outside the touch sensitive area, not reporting the event to the host.

Preferably, in order to prevent interference to and from the underneath of the electronic paper touch panel, the multiple touch electrodes sequentially comprise first electrodes in parallel to a first axis, second electrodes in parallel to a second axis, and third electrodes in parallel to the first axis, wherein a distance between the third electrodes and the electronic paper display is larger than a distance between the first electrodes and the electronic paper display, wherein the detecting is realized by the driving circuit, the sensing circuit and the interconnection network implementing mutual-capacitance sensing between the first electrodes and the second electrodes and coupling the third electrodes to ground voltage or a direct current voltage. Preferably, in order to increase probability and sensitivity of the detecting, the detecting further comprises that the second interconnection network lets electrodes of the electronic paper display corresponding to the touch sensitive area floating in voltage.

Preferably, in order to detect pressing events, the electronic paper touch panel further comprise an elastic dielectric layer between the second electrodes and the third electrodes, the detecting is further realized by the driving circuit, the sensing circuit and the interconnection network implementing mutual capacitance sensing between the second electrodes and the third electrodes. Preferably, in order to prevent interference, the detecting further comprises coupling the first electrodes to ground voltage or a direct current voltage.

Preferably, in order to detect events, the touch electrodes sequentially comprise first electrodes in parallel to a first axis, second electrodes in parallel to a second axis, and third electrodes in parallel to the first axis, wherein the second electrodes and the third electrodes are disposed in one electrode layer, wherein the detecting is realized by the driving circuit, the sensing circuit and the interconnection network implementing mutual capacitance sensing between the second electrodes and the third electrodes. Preferably, in order to increase probability and sensitivity of the detecting, the detecting further comprises that the second interconnection network lets electrodes of the electronic paper display corresponding to the touch sensitive area floating in voltage. Preferably, in order to increase probability and sensitivity of the detecting, the detecting further comprises having first electrodes floating in voltage.

Preferably, in order to detect pressing events, the electronic paper touch panel further comprises an elastic dielectric layer between the first electrodes and the second electrodes, the detecting is further realized by the driving circuit, the sensing circuit and the interconnection network implementing mutual capacitance sensing between the first electrodes and the second electrodes. Preferably, in order to prevent interference, the detecting further comprises that the second interconnection network coupling electrodes of the electronic paper display corresponding to the touch sensitive area to ground voltage or a direct current voltage.

Preferably, in order to clearly highlight the touch sensitive area, the control circuit is further for one or any combination of following: having the electronic paper display showing a color inside the touch sensitive area and showing another color outside the touch sensitive area; having the electronic paper display showing an illumination grade inside the touch sensitive area and showing another illumination grade outside the touch sensitive area; and having the electronic paper display showing a graph outside the touch sensitive area.

Preferably, in order to provide complete user input function, the control circuit is further for having the touch sensitive display shows a keyboard area, the keyboard area consists of multiple keys, the keyboard area is farther away from a user than the touch sensitive area.

Preferably, in order to provide similar configurations in multiple computers for a user, the processor is further configured for: receiving, from the host, a set of parameters corresponding to a user and setting up a position and a size of the touch sensitive area according to the set of parameters; and when the set of parameters corresponding to a user cannot be received, setting up the position and the size of the touch sensitive area according to a default set of parameters.

Preferably, in order to provide similar configurations in multiple computers having different sized electronic paper touch panels for a user, a position and a shape of the touch sensitive area are configured corresponding to proportional positions regarding to an edge and its adjacent edge and a ratio between the edge and the adjacent edge, respectively.

Preferably, in order to help a user to manipulate touch control in his/her dominate hand, the touch sensitive area comprises an edge which is not in parallel to any edge of the touch sensitive touch panel.

According to an embodiment of the present invention, an electronic system is provided. The electronic system comprising the electronic paper touch panel, the integrated apparatus and the host.

According to an embodiment of the present application, a method for setup a touch sensitive area of an electronic paper touch panel is provided. The method comprising: having an electronic paper display of the electronic paper touch panel marking an existing first touch sensitive area in a first display format; detecting an event via touch electrodes of the electronic paper touch panel; setting up a second touch sensitive area according to the detected event; and having the electronic paper display marking the second touch sensitive area in a second display format.

Preferably, in order to notify a host about the setup of the touch sensitive area, the method further comprises notifying a host to switch into a setup mode before the detecting; and after the second touch sensitive area is setup, notifying the host to exit the setup mode and transmitting data of the second touch sensitive area to the host.

Preferably, in order to let the user can continue adjusting the touch sensitive area, the method further comprises repeating the detecting step to detect a new event; when the new event is detected, setting up a third touch sensitive area according to the new event; having the electronic paper display marking the third touch sensitive area in the first display format; when the detecting step are repeated for a certain times while no new event is detected or a command for exiting the setup mode is received, setting up the second touch sensitive area as the same as the third touch sensitive area and having the electronic paper display marking the second touch sensitive area in the second display format.

Preferably, in order to adapt to slow refresh characteristic of the electronic paper display, the method is satisfied with one or any combination of following: a position of an edge of the first touch sensitive area is a distance away from a position of a corresponding edge of the second touch sensitive area in a first axis, the distance is an integer multiple of N pixels, N is a integer larger than 1; a position of another edge of the first touch sensitive area is a distance away from a position of a corresponding edge of the second touch sensitive area in a second axis, the distance is an integer multiple of M pixels, M is a integer larger than 1; a position of the edge of the first touch sensitive area is a distance away from a position of a corresponding edge of the third touch sensitive area in the first axis, the distance is an integer multiple of N pixels; and a position of the another edge of the first touch sensitive area is a distance away from a position of a corresponding edge of the third touch sensitive area in the second axis, the distance is an integer multiple of M pixels.

Preferably, in order to prevent that the touch sensitive area is set undersized, the method is further satisfied with one or any combination of followings: when the size of the second touch sensitive area is less than a predetermined threshold, setting the second touch sensitive area as the same as the first touch sensitive area; when the size of the third touch sensitive area is less than the predetermined threshold, setting the third touch sensitive area as the same as the first touch sensitive area; when an edge of the second touch sensitive area is less than a predetermined length, setting the second touch sensitive area as the same as the first touch sensitive area; and when an edge of the third touch sensitive area is less than the predetermined length, setting the third touch sensitive area as the same as the first touch sensitive area.

Preferably, in order to prompt that the electronic paper touch panel is in the setup mode, wherein the first display format includes one or any combination of followings: having a corresponding area blinking periodically; having edges of the corresponding area blinking periodically; showing graph or text inside the corresponding area; and having graph or text blinking periodically inside the corresponding area.

Preferably, in order to setup the touch sensitive area, the method further comprises one of following steps: when one event is detected, determining the position of the second touch sensitive area according to the detected one event; when one event is detected in the repeated detecting step, determining the position of the third touch sensitive area according to the one event detected in the repeated detecting step; when two events are detected, determining the size of the second touch sensitive area according to the detected two events; when two events are detected in the repeated detecting step, determining the size of the third touch sensitive area according to the detected two events detected in the repeated detecting step; when two events are detected, determining the position and the size of the second touch sensitive area according to the detected two events; and when two events are detected in the repeated detecting step, determining the position and the size of the third touch sensitive area according to the detected two events detected in the repeated detecting step.

According to an embodiment of the present application, an electronic system is provided. The electronic system comprising: an electronic paper touch panel; a touch sensitive processing apparatus; an electronic paper controller; and a host connected with the touch sensitive processing apparatus and the electronic paper controller. The host executes instructions stored in a non-volatile memory for: having the electronic paper controller to control an electronic paper display of the electronic paper touch panel marking an existing first touch sensitive area in a first display format; having the touch sensitive processing apparatus detecting an event via touch electrodes of the electronic paper touch panel; having the touch sensitive processing apparatus setting up a second touch sensitive area according to the detected event; and having the electronic paper controller to control the electronic paper display marking the second touch sensitive area in a second display format.

Preferably, in order to notify a host about the setup of the touch sensitive area, the host is further for: switching into a setup mode before the detecting; and exiting the setup mode after the second touch sensitive area is setup.

Preferably, in order to let the user can continue adjusting the touch sensitive area, the host is further for: having the touch sensitive processing apparatus repeating the detecting to detect a new event; when the new event is detected by the touch sensitive processing apparatus, setting up a third touch sensitive area according to the new event; having the electronic paper controller to control the electronic paper display marking the third touch sensitive area in the first display format; and when the detecting are repeated for a certain times while no new event is detected by the touch sensitive processing apparatus or a command for exiting the setup mode is received, setting up the second touch sensitive area as the same as the third touch sensitive area and having the electronic paper controller to control the electronic paper display marking the second touch sensitive area in the second display format.

Preferably, in order to adapt to slow refresh characteristic of the electronic paper display, the electronic system is satisfied with one or any combination of following: a position of an edge of the first touch sensitive area is a distance away from a position of a corresponding edge of the second touch sensitive area in a first axis, the distance is an integer multiple of N pixels, N is a integer larger than 1; a position of another edge of the first touch sensitive area is a distance away from a position of a corresponding edge of the second touch sensitive area in a second axis, the distance is an integer multiple of M pixels, M is a integer larger than 1; a position of the edge of the first touch sensitive area is a distance away from a position of a corresponding edge of the third touch sensitive area in the first axis, the distance is an integer multiple of N pixels; and a position of the another edge of the first touch sensitive area is a distance away from a position of a corresponding edge of the third touch sensitive area in the second axis, the distance is an integer multiple of M pixels.

Preferably, in order to prevent that the touch sensitive area is set undersized, the electronic system is further satisfied with one or any combination of followings: when the size of the second touch sensitive area is less than a predetermined threshold, setting the second touch sensitive area as the same as the first touch sensitive area; when the size of the third touch sensitive area is less than the predetermined threshold, setting the third touch sensitive area as the same as the first touch sensitive area; when an edge of the second touch sensitive area is less than a predetermined length, setting the second touch sensitive area as the same as the first touch sensitive area; and when an edge of the third touch sensitive area is less than the predetermined length, setting the third touch sensitive area as the same as the first touch sensitive area.

Preferably, in order to prompt that the electronic paper touch panel is in the setup mode, wherein the first display format includes one or any combination of followings: having a corresponding area blinking periodically; having edges of the corresponding area blinking periodically; showing graph or text inside the corresponding area; and having graph or text blinking periodically inside the corresponding area.

Preferably, in order to setup the touch sensitive area, the host is further for: when one event is detected, determining the position of the second touch sensitive area according to the detected one event; when one event is detected in the repeated detecting, determining the position of the third touch sensitive area according to the one event detected in the repeated detecting step; when two events are detected, determining the size of the second touch sensitive area according to the detected two events; when two events are detected in the repeated detecting, determining the size of the third touch sensitive area according to the detected two events detected in the repeated detecting step; when two events are detected, determining the position and the size of the second touch sensitive area according to the detected two events; and when two events are detected in the repeated detecting, determining the position and the size of the third touch sensitive area according to the detected two events detected in the repeated detecting step.

According to an embodiment of the present application, an integrated apparatus for setting up a touch sensitive area of an electronic paper touch panel. The integrated apparatus comprising: an interconnection network for connecting with touch electrodes of the electronic paper touch panel, respectively; a driving circuit for connecting with the interconnection network; a sensing circuit for connecting with the interconnection network; an interface module for connecting with an host; a second interconnection network for connecting with electrodes of an electronic paper display of the electronic paper touch panel, respectively; a control circuit for connecting with the second interconnection network; and a processor for executing instructions stored in non-volatile memory for having the control circuit to control the electronic paper display marking an existing first touch sensitive area in a first display format; having the interconnection network, the driving circuit and the sensing circuit detecting an event via the touch electrodes; setting up a second touch sensitive area according to the detected event; and having the control circuit to control the electronic paper display marking the second touch sensitive area in a second display format.

Preferably, in order to notify a host about the setup of the touch sensitive area, the processor is further for: notifying the host into a setup mode before the detecting; and after the second touch sensitive area is setup, notifying the host to exit the setup mode and transmitting data of the second touch sensitive area.

Preferably, in order to let the user can continue adjusting the touch sensitive area, the processor is further for: having the interconnection network, the driving circuit and the sensing circuit repeating the detecting to detect a new event; when the new event is detected, setting up a third touch sensitive area according to the new event; having the control circuit to control the electronic paper display marking the third touch sensitive area in the first display format; and when the detecting are repeated for a certain times while no new event is detected or a command for exiting the setup mode is received, setting up the second touch sensitive area as the same as the third touch sensitive area and having the control circuit to control the electronic paper display marking the second touch sensitive area in the second display format.

Preferably, in order to adapt to slow refresh characteristic of the electronic paper display, the integrated apparatus is satisfied with one or any combination of following: a position of an edge of the first touch sensitive area is a distance away from a position of a corresponding edge of the second touch sensitive area in a first axis, the distance is an integer multiple of N pixels, N is a integer larger than 1; a position of another edge of the first touch sensitive area is a distance away from a position of a corresponding edge of the second touch sensitive area in a second axis, the distance is an integer multiple of M pixels, M is a integer larger than 1; a position of the edge of the first touch sensitive area is a distance away from a position of a corresponding edge of the third touch sensitive area in the first axis, the distance is an integer multiple of N pixels; and a position of the another edge of the first touch sensitive area is a distance away from a position of a corresponding edge of the third touch sensitive area in the second axis, the distance is an integer multiple of M pixels.

Preferably, in order to prevent that the touch sensitive area is set undersized, the integrated apparatus is further satisfied with one or any combination of followings: when the size of the second touch sensitive area is less than a predetermined threshold, setting the second touch sensitive area as the same as the first touch sensitive area; when the size of the third touch sensitive area is less than the predetermined threshold, setting the third touch sensitive area as the same as the first touch sensitive area; when an edge of the second touch sensitive area is less than a predetermined length, setting the second touch sensitive area as the same as the first touch sensitive area; and when an edge of the third touch sensitive area is less than the predetermined length, setting the third touch sensitive area as the same as the first touch sensitive area.

Preferably, in order to prompt that the electronic paper touch panel is in the setup mode, wherein the first display format includes one or any combination of followings: having a corresponding area blinking periodically; having edges of the corresponding area blinking periodically; showing graph or text inside the corresponding area; and having graph or text blinking periodically inside the corresponding area.

Preferably, in order to setup the touch sensitive area, the processor is further for: when one event is detected, determining the position of the second touch sensitive area according to the detected one event; when one event is detected in the repeated detecting, determining the position of the third touch sensitive area according to the one event detected in the repeated detecting step; when two events are detected, determining the size of the second touch sensitive area according to the detected two events; when two events are detected in the repeated detecting, determining the size of the third touch sensitive area according to the detected two events detected in the repeated detecting step; when two events are detected, determining the position and the size of the second touch sensitive area according to the detected two events; and when two events are detected in the repeated detecting, determining the position and the size of the third touch sensitive area according to the detected two events detected in the repeated detecting step.

According to an embodiment of the present application, a electronic system is provided. The electronic system comprising the electronic paper touch panel, the integrated apparatus and the host.

The mechanism for setting up a touch sensitive area provided by the present application can let the user freely customize the position and the size of the touch sensitive area of the electronic paper touch panel. This can maximize user experience, accelerate input efficiency and prevent consequence and damages caused by mistaken touch to the touch panel.

The touch sensitive mechanism of an electronic paper touch panel provided by the present application can let the user freely use multi-finger inputs and can detect approaching, touching and pressing events. It can increase input options and user experiences.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for setup a touch sensitive area of an electronic paper touch panel, comprising:
    having an electronic paper display of the electronic paper touch panel marking an existing first touch sensitive area in a first display format;
    detecting an event via touch electrodes of the electronic paper touch panel, wherein the event is a part of a drag gesture made by a single finger;
    setting up a second touch sensitive area according to a position of the detected event, wherein the position of the detected event is on the electronic paper display of the electronic paper touch panel; and
    having the electronic paper display marking the second touch sensitive area in a second display format, wherein the marked first and the second touch sensitive areas are overlapped partly.

2. The method as claimed in claim 1, further comprises:
    notifying a host to switch into a setup mode before the detecting; and
    after the second touch sensitive area is setup, notifying the host to exit the setup mode and transmitting data of the second touch sensitive area to the host.

3. The method as claimed in claim 1, further comprises:
    repeating the detecting step to detect a new event;
    when the new event is detected, setting up a third touch sensitive area according to the new event;
    having the electronic paper display marking the third touch sensitive area in the first display format;
    when the detecting step are repeated for a certain times while no new event is detected or a command for exiting the setup mode is received, setting up the second touch sensitive area as the same as the third touch sensitive area and having the electronic paper display marking the second touch sensitive area in the second display format.

4. The method as claimed in claim 3, wherein the method is satisfied with one or any combination of following:
    a position of an edge of the first touch sensitive area is a distance away from a position of a corresponding edge of the second touch sensitive area in a first axis, the distance is an integer multiple of N pixels, N is an integer larger than 1;
    a position of another edge of the first touch sensitive area is a distance away from a position of a corresponding edge of the second touch sensitive area in a second axis, the distance is an integer multiple of M pixels, M is an integer larger than 1;

a position of the edge of the first touch sensitive area is a distance away from a position of a corresponding edge of the third touch sensitive area in the first axis, the distance is an integer multiple of N pixels; and a position of the another edge of the first touch sensitive area is a distance away from a position of a corresponding edge of the third touch sensitive area in the second axis, the distance is an integer multiple of M pixels.

5. The method as claimed in claim 3, wherein the method is satisfied with one or any combination of following:

when the size of the second touch sensitive area is less than a predetermined threshold, setting the second touch sensitive area as the same as the first touch sensitive area;

when the size of the third touch sensitive area is less than the predetermined threshold, setting the third touch sensitive area as the same as the first touch sensitive area;

when an edge of the second touch sensitive area is less than a predetermined length, setting the second touch sensitive area as the same as the first touch sensitive area; and when an edge of the third touch sensitive area is less than the predetermined length, setting the third touch sensitive area as the same as the first touch sensitive area.

6. The method as claimed in claim 3, further comprises one of following steps:

when one event is detected, determining the position of the second touch sensitive area according to the detected one event;

when one event is detected in the repeated detecting step, determining the position of the third touch sensitive area according to the one event detected in the repeated detecting step;

when two events are detected, determining the size of the second touch sensitive area according to the detected two events;

when two events are detected in the repeated detecting step, determining the size of the third touch sensitive area according to the detected two events detected in the repeated detecting step;

when two events are detected, determining the position and the size of the second touch sensitive area according to the detected two events; and when two events are detected in the repeated detecting step, determining the position and the size of the third touch sensitive area according to the detected two events detected in the repeated detecting step.

7. The method as claimed in claim 1, wherein the first display format includes one or any combination of followings:

having a corresponding area blinking periodically;

having edges of the corresponding area blinking periodically;

showing graph or text inside the corresponding area; and having graph or text blinking periodically inside the corresponding area.

8. An electronic system, comprising:
an electronic paper touch panel;
a touch sensitive processing apparatus;
an electronic paper controller; and
a host connected with the touch sensitive processing apparatus and the electronic paper controller, wherein the host executes instructions stored in a non-volatile memory for:

having the electronic paper controller to control an electronic paper display of the electronic paper touch panel marking an existing first touch sensitive area in a first display format;

having the touch sensitive processing apparatus detecting an event via touch electrodes of the electronic paper touch panel, wherein the event is a part of a drag gesture made by a single finger;

having the touch sensitive processing apparatus setting up a second touch sensitive area according to a position of the detected event, wherein the position of the detected event is on the electronic paper display of the electronic paper touch panel; and having the electronic paper controller to control the electronic paper display marking the second touch sensitive area in a second display format, wherein the marked first and the second touch sensitive areas are overlapped partly.

9. The electronic system as claimed in claim 8, wherein the host is further for:

switching into a setup mode before the detecting; and exiting the setup mode after the second touch sensitive area is setup.

10. The electronic system as claimed in claim 8, wherein the host is further for:

having the touch sensitive processing apparatus repeating the detecting to detect a new event;

when the new event is detected by the touch sensitive processing apparatus, setting up a third touch sensitive area according to the new event;

having the electronic paper controller to control the electronic paper display marking the third touch sensitive area in the first display format; and when the detecting are repeated for a certain times while no new event is detected by the touch sensitive processing apparatus or a command for exiting the setup mode is received, setting up the second touch sensitive area as the same as the third touch sensitive area and having the electronic paper controller to control the electronic paper display marking the second touch sensitive area in the second display format.

11. The electronic system as claimed in claim 10, wherein the electronic system is satisfied with one or any combination of following:

a position of an edge of the first touch sensitive area is a distance away from a position of a corresponding edge of the second touch sensitive area in a first axis, the distance is an integer multiple of N pixels, N is an integer larger than 1;

a position of another edge of the first touch sensitive area is a distance away from a position of a corresponding edge of the second touch sensitive area in a second axis, the distance is an integer multiple of M pixels, M is an integer larger than 1;

a position of the edge of the first touch sensitive area is a distance away from a position of a corresponding edge of the third touch sensitive area in the first axis, the distance is an integer multiple of N pixels; and a position of the another edge of the first touch sensitive area is a distance away from a position of a corresponding edge of the third touch sensitive area in the second axis, the distance is an integer multiple of M pixels.

12. The electronic system as claimed in claim 10, wherein the electronic system is satisfied with one or any combination of following:

when the size of the second touch sensitive area is less than a predetermined threshold, setting the second touch sensitive area as the same as the first touch sensitive area;

when the size of the third touch sensitive area is less than the predetermined threshold, setting the third touch sensitive area as the same as the first touch sensitive area;

when an edge of the second touch sensitive area is less than a predetermined length, setting the second touch sensitive area as the same as the first touch sensitive area; and when an edge of the third touch sensitive area is less than the predetermined length, setting the third touch sensitive area as the same as the first touch sensitive area.

13. The electronic system as claimed in claim 10, the host is further for:

when one event is detected, determining the position of the second touch sensitive area according to the detected one event;

when one event is detected in the repeated detecting, determining the position of the third touch sensitive area according to the one event detected in the repeated detecting step;

when two events are detected, determining the size of the second touch sensitive area according to the detected two events;

when two events are detected in the repeated detecting, determining the size of the third touch sensitive area according to the detected two events detected in the repeated detecting step;

when two events are detected, determining the position and the size of the second touch sensitive area according to the detected two events; and when two events are detected in the repeated detecting, determining the position and the size of the third touch sensitive area according to the detected two events detected in the repeated detecting step.

14. The electronic system as claimed in claim 8, wherein the first display format includes one or any combination of followings:

having a corresponding area blinking periodically;
having edges of the corresponding area blinking periodically;
showing graph or text inside the corresponding area; and
having graph or text blinking periodically inside the corresponding area.

15. An integrated apparatus for setting up a touch sensitive area of an electronic paper touch panel, comprising:

an interconnection network for connecting with touch electrodes of the electronic paper touch panel, respectively;

a driving circuit for connecting with the interconnection network;

a sensing circuit for connecting with the interconnection network;

an interface module for connecting with an host;

a second interconnection network for connecting with electrodes of an electronic paper display of the electronic paper touch panel, respectively;

a control circuit for connecting with the second interconnection network; and a processor for executing instructions stored in non-volatile memory for:

having the control circuit to control the electronic paper display marking an existing first touch sensitive area in a first display format;

having the interconnection network, the driving circuit and the sensing circuit detecting an event via the touch electrodes, wherein the event is a part of a drag gesture made by a single finger;

setting up a second touch sensitive area according to a position of the detected event, wherein the position of the detected event is on the electronic paper display of the electronic paper touch panel; and having the control circuit to control the electronic paper display marking the second touch sensitive area in a second display format, wherein the marked first and the second touch sensitive areas are overlapped partly.

16. The integrated apparatus as claimed in claim 15, wherein the processor is further for:

notifying the host into a setup mode before the detecting; and after the second touch sensitive area is setup, notifying the host to exit the setup mode and transmitting data of the second touch sensitive area.

17. The integrated apparatus as claimed in claim 15, wherein the processor is further for:

having the interconnection network, the driving circuit and the sensing circuit repeating the detecting to detect a new event;

when the new event is detected, setting up a third touch sensitive area according to the new event;

having the control circuit to control the electronic paper display marking the third touch sensitive area in the first display format; and when the detecting are repeated for a certain times while no new event is detected or a command for exiting the setup mode is received, setting up the second touch sensitive area as the same as the third touch sensitive area and having the control circuit to control the electronic paper display marking the second touch sensitive area in the second display format.

18. The integrated apparatus as claimed in claim 17, wherein the integrated apparatus is satisfied with one or any combination of following:

a position of an edge of the first touch sensitive area is a distance away from a position of a corresponding edge of the second touch sensitive area in a first axis, the distance is an integer multiple of N pixels, N is an integer larger than 1;

a position of another edge of the first touch sensitive area is a distance away from a position of a corresponding edge of the second touch sensitive area in a second axis, the distance is an integer multiple of M pixels, M is an integer larger than 1;

a position of the edge of the first touch sensitive area is a distance away from a position of a corresponding edge of the third touch sensitive area in the first axis, the distance is an integer multiple of N pixels; and a position of the another edge of the first touch sensitive area is a distance away from a position of a corresponding edge of the third touch sensitive area in the second axis, the distance is an integer multiple of M pixels.

19. The integrated apparatus as claimed in claim 17, wherein the integrated apparatus is satisfied with one or any combination of following:

when the size of the second touch sensitive area is less than a predetermined threshold, setting the second touch sensitive area as the same as the first touch sensitive area;

when the size of the third touch sensitive area is less than the predetermined threshold, setting the third touch sensitive area as the same as the first touch sensitive area;

when an edge of the second touch sensitive area is less than a predetermined length, setting the second touch sensitive area as the same as the first touch sensitive area; and when an edge of the third touch sensitive area is less than the predetermined length, setting the third touch sensitive area as the same as the first touch sensitive area.

20. The integrated apparatus as claimed in claim 17, wherein the processor is further for:

when one event is detected, determining the position of the second touch sensitive area according to the detected one event;

when one event is detected in the repeated detecting, determining the position of the third touch sensitive area according to the one event detected in the repeated detecting step;

when two events are detected, determining the size of the second touch sensitive area according to the detected two events;

when two events are detected in the repeated detecting, determining the size of the third touch sensitive area according to the detected two events detected in the repeated detecting step;

when two events are detected, determining the position and the size of the second touch sensitive area according to the detected two events; and when two events are detected in the repeated detecting, determining the position and the size of the third touch sensitive area according to the detected two events detected in the repeated detecting step.

21. The integrated apparatus as claimed in claim 15, wherein the first display format includes one or any combination of followings:

having a corresponding area blinking periodically;

having edges of the corresponding area blinking periodically;

showing graph or text inside the corresponding area; and having graph or text blinking periodically inside the corresponding area.

22. An electronic system, comprising the electronic paper touch panel, the integrated apparatus and the host as recited in one of claims 15 through 20.

* * * * *